United States Patent
Cho et al.

(10) Patent No.: US 10,424,964 B2
(45) Date of Patent: Sep. 24, 2019

(54) ELECTRONIC DEVICE AND METHOD FOR CONTROLLING TRANSMISSION/RECEPTION OF WIRELESS POWER

(71) Applicant: Samsung Electronics Co., Ltd., Gyeonggi-do (KR)

(72) Inventors: Yu-Min Cho, Seoul (KR); Yeon-Woo Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 366 days.

(21) Appl. No.: 15/348,489

(22) Filed: Nov. 10, 2016

(65) Prior Publication Data
US 2017/0133881 A1    May 11, 2017

(30) Foreign Application Priority Data

Nov. 10, 2015  (KR) .................. 10-2015-0157729

(51) Int. Cl.
| | |
|---|---|
| *H02J 50/10* | (2016.01) |
| *H02J 50/15* | (2016.01) |
| *H02J 50/40* | (2016.01) |
| *H02J 7/02* | (2016.01) |
| *G06F 1/00* | (2006.01) |
| *H02J 7/00* | (2006.01) |
| *H02J 50/90* | (2016.01) |

(52) U.S. Cl.
CPC ............. *H02J 50/10* (2016.02); *G06F 1/00* (2013.01); *H02J 7/0042* (2013.01); *H02J 7/025* (2013.01); *H02J 50/15* (2016.02); *H02J 50/40* (2016.02); *H02J 50/90* (2016.02); *H02J 7/0047* (2013.01)

(58) Field of Classification Search
None
See application file for complete search history.

(56) References Cited

U.S. PATENT DOCUMENTS

| | | |
|---|---|---|
| 8,954,762 B2 | 2/2015 | Boss et al. |
| 2010/0194335 A1* | 8/2010 | Kirby ............... H02J 5/005 320/108 |

\* cited by examiner

*Primary Examiner* — Thienvu V Tran
*Assistant Examiner* — David M Stables
(74) *Attorney, Agent, or Firm* — The Farrell Law Firm, P.C.

(57) ABSTRACT

An electronic device and a method for controlling transmission/reception of wireless power by the electronic device are provided. The method includes sensing at least one external electronic device, selecting at least one wireless power transmission/reception conductive pattern element corresponding to the sensed at least one external electronic device, and transmitting/receiving wireless power to/from the sensed at least one external electronic device by using the selected at least one wireless power transmission/reception conductive pattern element.

20 Claims, 9 Drawing Sheets

ELECTRONIC DEVICE AND METHOD FOR CONTROLLING TRANSMISSION/RECEPTION OF WIRELESS POWER

PRIORITY

This application claims priority under 35 U.S.C. § 119(a) to Korean Patent Application Serial No. 10-2015-0157729, which was filed in the Korean Intellectual Property Office on Nov. 10, 2015, the entire content of which is incorporated herein by reference.

BACKGROUND

1. Field of the Disclosure

The present disclosure relates generally to an electronic device, and more particularly, to an electronic device and a method for controlling transmission/reception of wireless power.

2. Description of the Related Art

Recently, various services and additional functions provided by electronic devices have been gradually expanded. In order to increase the value of electronic devices and satisfy various desires of users, communication service providers or manufacturers of electronic devices have provided additional functions, and have competitively developed electronic devices in order to differentiate themselves from other operators. As an example of satisfying the desires of the users, electronic devices are provided with a function for performing wireless charging between the electronic device and a charger.

When misalignment between the electronic device and the charger occurs, conventional wireless charging is problematic in that the conventional wireless charging is less efficient and heat may be generated. Also, since an electronic device has only one coil configured within, the conventional wireless charging cannot charge multiple devices.

SUMMARY

The present disclosure has been made to address at least the above-mentioned problems and/or disadvantages and to provide at least the advantages described below.

Accordingly, an aspect of the present disclosure is to provide a method of improving wireless charging efficiency by providing an electronic device with multiple wireless power transmission/reception conductive pattern elements for performing charging of external electronic devices having various sizes or forms by selecting one or more of the conductive pattern elements for charging based on the size or the form of the external electronic device to be charged.

In accordance with an aspect of the present disclosure, a method for controlling transmission/reception of wireless power by an electronic device is provided. The method includes sensing at least one external electronic device, selecting at least one wireless power transmission/reception conductive pattern element corresponding to the sensed at least one external electronic device, and transmitting/receiving wireless power to/from the sensed at least one external electronic device by using the selected at least one wireless power transmission/reception conductive pattern element. In accordance with another aspect of the present disclosure, an electronic device for controlling transmission/reception of wireless power is provided. The electronic device includes a display apparatus, and a control circuit that senses at least one external electronic device, selects at least one wireless power transmission/reception conductive pattern element corresponding to the sensed at least one external electronic device, and controls transmission/reception of wireless power to/from the sensed at least one external electronic device by using the selected at least one wireless power transmission/reception conductive pattern elementIn accordance with another aspect of the present disclosure, an electronic device is provided. The electronic device includes a housing, a display module that is disposed on one surface of the housing, a plurality of conductive pattern elements that are disposed within the housing, and a processor that senses that an external device is adjacent to a first area of the display module, wirelessly transmits power to the external device by using one or more of the plurality of conductive pattern elements corresponding to the first area, in response to the sensing, and displays a screen by using a second area of the display module.

In accordance with another aspect of the present disclosure, an apparatus is provided. The apparatus includes a housing, a first conductive pattern element and a second conductive pattern element disposed within the housing, wherein the first conductive pattern element and the second conductive pattern element wirelessly transmit power, at least one user interface disposed inside of the housing or on one surface of the housing, and a processor that monitors whether an external device is adjacent to the first conductive pattern element and the second conductive pattern element, provides, through the at least one user interface, an indication that the external device is capable of being charged by using at least one conductive pattern element selected from the first conductive pattern element and the second conductive pattern element, and wirelessly supplies power to the external device through the selected at least one one conductive pattern element.

In accordance with another aspect of the present disclosure, an apparatus is provided. The apparatus includes a housing, a first conductive pattern element and a second conductive pattern element disposed within, wherein the first conductive pattern element and the second conductive pattern element wirelessly transmit power, at least one user interface disposed inside of the housing or on one surface of the housing; and a circuit that monitors whether an external device is adjacent to the first conductive pattern element and the second conductive pattern element, provides, through the at least one user interface, an indication that the external device is capable of being charged by using at least one conductive pattern element selected from the first conductive pattern element and the second conductive pattern element, and wirelessly supplies power to the external device through the selected at least one one conductive pattern element.

In accordance with another aspect of the present disclosure, a non-transitory computer-readable storage medium having, stored thereon, instructions. The instructions, when executed, perform the steps of sensing that an external device is adjacent to a first area of a display module of an electronic device, in response to the sensing, wirelessly transmitting power to the external device by using one or more of a plurality of conductive pattern elements, disposed in the electronic device, corresponding to the first area, and displaying a screen in a second area of the display module.

In accordance with another aspect of the present disclosure, a non-transitory computer-readable storage medium having, stored thereon, instructions. The instructions, when executed, perform the steps of monitoring whether an external device is adjacent to a first conductive pattern element and a second conductive pattern element disposed in an apparatus, providing, through at least one user interface of the apparatus, an indication that the external device is capable of being charged by using at least one conductive pattern element selected from the first conductive pattern element and the second conductive pattern element, and wirelessly supplying power to the external device through the selected at least one one conductive pattern element.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figure 1:
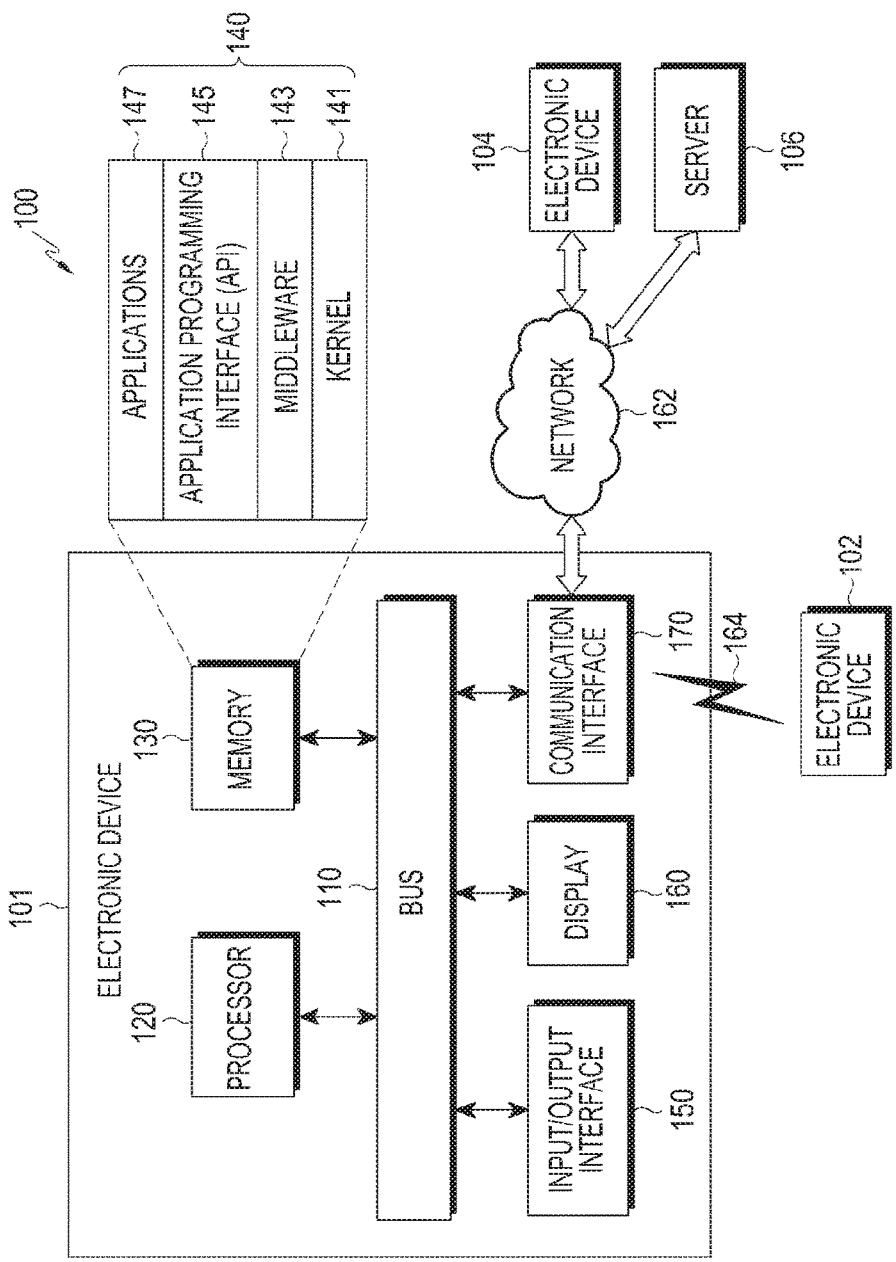
FIG. 1 is a block diagram of an electronic device in a network environment, according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar elements.

As used herein, the expressions "have" and "include" refer to the existence of a corresponding feature (e.g., numeral, function, operation, or element such as component), and do not exclude one or more additional features.

In the present disclosure, the expressions "A or B", "at least one of A or/and B", and "one or more of A or/and B" may include all possible combinations of the items listed. For example, the expressions "A or B", "at least one of A and B", and "at least one of A or B" refer to all of (1) including A, (2) including B, or (3) including A and B.

The expressions "first", "second", etc. used herein may modify various elements regardless of the order and/or the importance, but does not limit the corresponding elements. For example, a first user device and a second user device indicate different user devices although both of them are user devices. For example, a first element may be referred to as a second element, and similarly, a second element may be referred to as a first element without departing from the scope of the present disclosure.

It should be understood that when an element (e.g., a first element) is referred to as being "connected," or "coupled," to another element (e.g., a second element), the element may be directly connected or coupled to the other element or any other element (e.g., a third element) may be interposed between them. In contrast, when an element (e.g., a first element) is referred to as being "directly connected," or "directly coupled" to another element (e.g., a second element), there is no element (e.g., third element) interposed between the first element and the second element.

The expression "configured to" used in the present disclosure may be used interchangeably with, for example, "suitable for", "having the capacity to", "designed to", "adapted to", "made to", or "capable of", according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. an embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in context. Unless defined otherwise, all terms used herein, including technical and scientific terms, have the same meaning as those commonly understood by a person skilled in the art to which the present disclosure pertains. Such terms as those defined in a generally used dictionary may be interpreted to have the same meanings as the contextual meanings in the relevant field of the art, and are not to be interpreted to have ideal or excessively formal meanings unless clearly so defined in the present disclosure.

In some cases, even terms defined in the present disclosure should not be interpreted to exclude embodiments of the present disclosure.

An electronic device according to various embodiments of the present disclosure may include at least one of a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. According to various embodiments of the present disclosure, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to some embodiments of the present disclosure, the electronic device may be a home appliance. The home appliance may include at least one of a television, a digital versatile disk (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ and PlayStation™), an electronic dictionary, an electronic key, a camcorder, a charging device and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device, and a gyro-compass), an avionics device, a security device, an automotive head unit, a robot for home or industry, an automatic teller machine (ATM), point of sales (POS) machine, or an Internet of Things (IoT) device (e.g., a light bulb, various sensors, an electric or gas meter, a sprinkler device, a fire alarm, a thermostat, a streetlamp, a toaster, a sporting goods, a hot water tank, a heater, a boiler, etc.).

According to some embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter).

In various embodiments of the present disclosure, the electronic device may be a combination of one or more of the aforementioned various devices. The electronic device may also be a flexible device.

Further, the electronic device according to an embodiment of the present disclosure is not limited to the aforementioned devices, and may include a new electronic device according to the development of technology.

Hereinafter, an electronic device according to various embodiments of the present disclosure will be described with reference to the accompanying drawings. In the present disclosure, the term "user" may indicate a person using an electronic device or a device (e.g. an artificial intelligence electronic device) using an electronic device.

FIG. 1 is a block diagram of an electronic device in a network environment, according to various embodiments of the present disclosure.

Referring to FIG. 1, an electronic device 101 within a networking environment 100 is provided. The electronic device 101 may include a bus 110, a processor 120, a memory 130, an input/output interface 150, a display 160, and a communication interface 170. In some embodiments of the present disclosure, at least one of the above elements of the electronic device 101 may be omitted from the electronic device 101, or the electronic device 101 may additionally include other elements.

The bus 110 is a circuit that interconnects the elements 110 to 170 and delivers a communication (e.g., a control message and/or data) between the elements 110 to 170.

The processor 120 may include one or more of a central processing unit (CPU), an application processor (AP), and a communication processor (CP). The processor 120 may perform calculations or data processing related to control and/or communication by at least one of the other elements of the electronic device 101.

The memory 130 may include a volatile memory and/or a non-volatile memory. The memory 130 may store commands or data related to at least one of the other elements of the electronic device 101. The memory 130 may store software and/or a program 140. The program 140 may include a kernel 141, middleware 143, an application programming interface (API) 145, and/or applications 147. At least some of the kernel 141, the middleware 143, and the API 145 may be referred to as an "operating system (OS)."

For example, the kernel 141 may control or manage system resources (e.g., the bus 110, the processor 120, the memory 130, and the like) used to execute operations or functions implemented by the other programs (e.g., the middleware 143, the API 145, and the applications 147). Also, the kernel 141 may provide an interface capable of controlling or managing the system resources by accessing the individual elements of the electronic device 101 by using the middleware 143, the API 145, or the applications 147.

For example, the middleware 143 may serve as an intermediary that enables the API 145 or the applications 147 to communicate with the kernel 141 and to exchange data therewith.

Also, the middleware 143 may process one or more task requests received from the applications 147 according to a priority. For example, the middleware 143 may assign a priority, which enables the use of system resources (e.g., the bus 110, the processor 120, the memory 130, etc.) of the electronic device 101, to at least one of the applications 147. For example, the middleware 143 may perform scheduling, load balancing, or the like of the one or more task requests by processing the one or more task requests according to the priority assigned to the at least one of the applications 147.

The API 145 is an interface through which the applications 147 control a function provided by the kernel 141 or the middleware 143, and may include at least one interface or function (e.g., command) for file control, window control, image processing, character control, or the like.

For example, the input/output interface 150 may serve as an interface capable of delivering a command or data, which is input from a user or another external device, to the other elements within the electronic device 101. Also, the input/output interface 150 may output, to the user or another external device, commands or data received from the other elements within the electronic device 101.

Examples of the display 160 may include a liquid crystal display (LCD), a light-emitting diode (LED) display, an organic light-emitting diode (OLED) display, a microelectromechanical systems (MEMS) display, and an electronic paper display. For example, the display 160 may display various types of content (e.g., text, images, videos, icons, symbols, etc.) to the user. The display 160 may include a touch screen, and may receive a touch input, a gesture input, a proximity input, or a hovering input provided by an electronic pen or a body part of the user.

The communication interface 170 may establish communication between the electronic device 101 and a first external electronic device 102, a second external electronic device 104, or a server 106. For example, the communication interface 170 may be connected through short-range communication 164 to communicate with the first external electronic device 102, and may be connected to a network 162 through wireless or wired communication to communicate with the second external electronic device 104 or the server 106.

The wireless communication may be performed by using at least one of long-term evolution (LTE), LTE-advanced (LTE-A), code division multiple access (CDMA), wideband CDMA (WCDMA), universal mobile telecommunications system (UMTS), WiBro (Wireless Broadband), and global system for mobile communications (GSM), as a cellular communication protocol. The wireless communication may include the short-range communication 164. The short-range communication 164 may be performed by using at least one of Wi-Fi, Bluetooth (BT), near field communication (NFC), and global navigation satellite system (GNSS). The GNSS may include at least one of a global positioning system (GPS), a global navigation satellite system (Glonass), a Beidou navigation satellite system (Beidou), and Galileo, a European global satellite-based navigation system, according to a use area, a bandwidth, or the like. Hereinafter, in the present disclosure, the term "GPS" may be used interchangeably with the term "GNSS."

The wired communication may be performed by using at least one of a universal serial bus (USB), a high definition multimedia interface (HDMI), recommended standard 232 (RS-232), and a plain old telephone service (POTS).

The network 162 may include at least one of communication networks, such as a computer network (e.g., a local area network (LAN), or a wide area network (WAN)), the Internet, and a telephone network.

Each of the first and second external electronic devices 102 and 104 may be of a type identical to or different from that of the electronic device 101. The server 106 may include a group of one or more servers.

All or some of operations performed by the electronic device 101 may be performed by another electronic device or multiple electronic devices (e.g., the first and second external electronic devices 102 and 104 or the server 106). When the electronic device 101 needs to perform some functions or services automatically or by a request, the electronic device 101 may send, to another device (e.g., the first external electronic device 102, the second external electronic device 104, or the server 106), a request for performing at least some functions related to the functions or services, instead of performing the functions or services by itself, or additionally. In this case, the otherelectronic device (e.g., the first external electronic device 102, the second external electronic device 104, or the server 106) may execute the requested functions or the additional functions, and may deliver a result of the execution to the electronic device 101. The electronic device 101 may process the received result without any change or additionally and may provide the requested functions or services. To this end, use may be made of cloud computing technology, distributed computing technology, or client-server computing technology.

Figure 2:
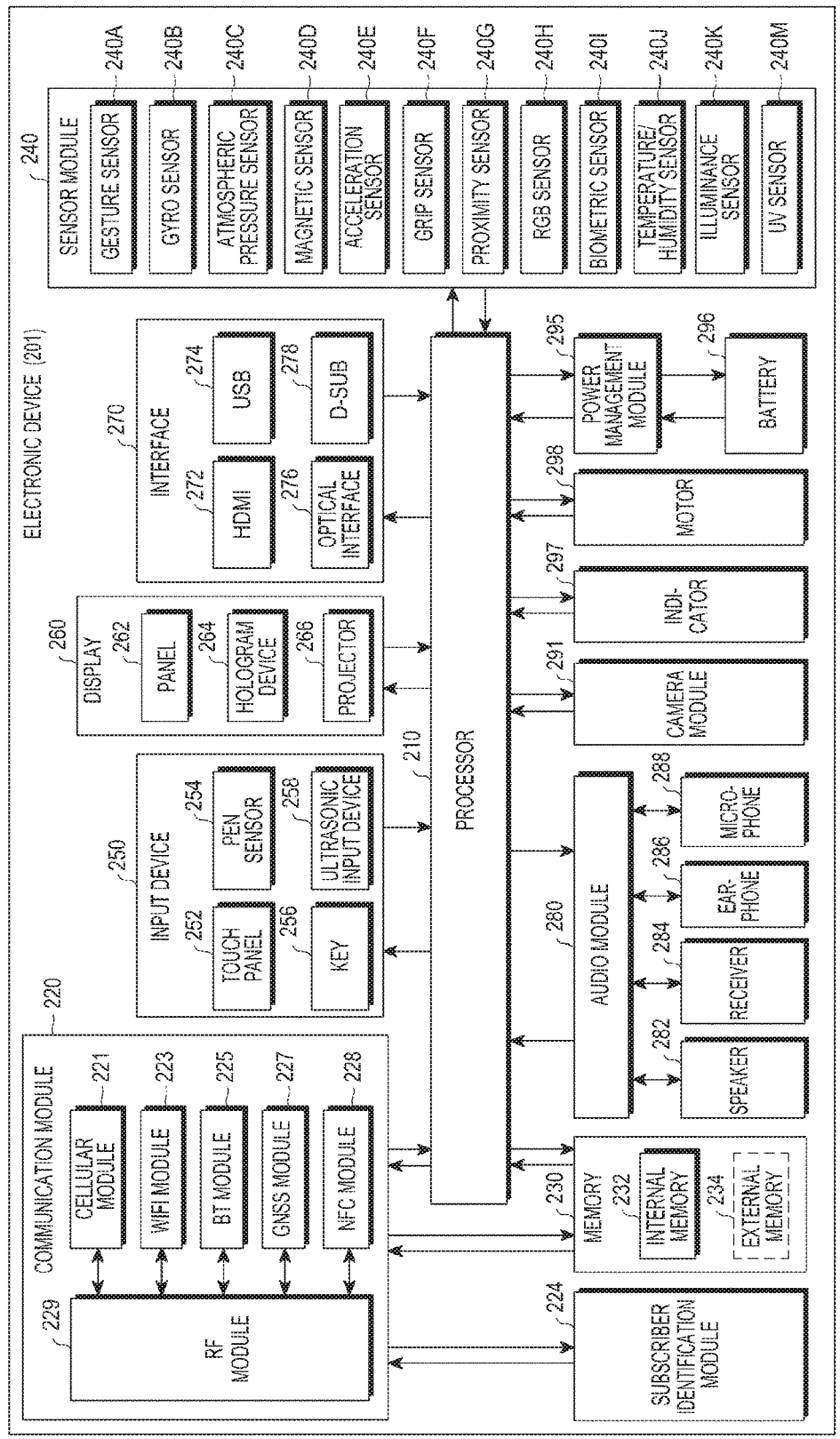
FIG. 2 is a block diagram of a configuration of an electronic device, according to an embodiment of the present disclosure.

FIG. 2 is a block diagram of a configuration of an electronic device, according to an embodiment of the present disclosure.

Referring to FIG. 2, an electronic device 201 is provided. The electronic device 201 may include the whole or a part of the electronic device 101 illustrated in FIG. 1. The electronic device 201 may include at least one processor (e.g., an AP) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware or software elements connected to the processor 210 by running an OS or an application program, and may perform the processing of and arithmetic operations on various data. The processor 210 may be implemented by a system on chip (SoC). The processor 210 may further include a graphical processing unit (GPU) and/or an image signal processor. The processor 210 may include at least some of the other elements of the electronic device 201 (e.g., a cellular module 221). The processor 210 may load, into a volatile memory, instructions or data received from at least one (e.g., a non-volatile memory) of the other elements and may process the loaded instructions or data, and may store various data in a non-volatile memory.

The communication module 220 may have a configuration identical or similar to that of the communication interface 170 illustrated in FIG. 1. The communication module 220 may include the cellular module 221, a Wi-Fi module 223, a BT module 225, a GNSS module 227 (e.g., a GPS module, a Glonass module, a Beidou module, or a Galileo module), an NFC module 228, and a Radio Frequency (RF) module 229.

The cellular module 221 may provide a voice call, a video call, a text message service, an Internet service, and the like through a communication network. The cellular module 221 may identify or authenticate the electronic device 201 in the communication network by using the subscriber identification module 224. The cellular module 221 may perform at least some of the functions that the processor 210 may provide. The cellular module 221 may include a CP.

Each of the Wi-Fi module 223, the BT module 225, the GNSS module 227, and the NFC module 228 may include a processor for processing data transmitted and received through the relevant module. According to some embodiments of the present disclosure, at least some combination of the cellular module 221, the Wi-Fi module 223, the BT module 225, the GNSS module 227, and the NFC module 228 may be included in one Integrated Chip (IC) or IC package.

The RF module 229 may transmit and receive communication signals (e.g., RF signals). The RF module 229 may include a transceiver, a power amplifier module (PAM), a frequency filter, a low noise amplifier (LNA), and an antenna. At least one of the cellular module 221, the Wi-Fi module 223, the BT module 225, the GNSS module 227, and the NFC module 228 may transmit and receive RF signals through a separate RF module.

The subscriber identification module 224 may include a card and/or an embedded SIM, and may contain unique identification information (e.g., an integrated circuit card identifier (ICCID)) or subscriber information (e.g., an international mobile subscriber identity (IMSI)).

The memory 230 may include an internal memory 232 or an external memory 234.

The internal memory 232 may include at least one of a volatile memory (e.g., a dynamic random access memory (DRAM), a static RAM (SRAM), a synchronous DRAM (SDRAM), etc.); a non-volatile memory (e.g., a one-time programmable read-only memory (OTPROM), a programmable ROM (PROM), an erasable and programmable ROM (EPROM), an electrically erasable and programmable ROM (EEPROM), a mask ROM, a flash ROM, a flash memory (e.g., a Not AND (NAND) flash memory, a Not OR (NOR) flash memory, etc.); a hard drive; and a solid state drive (SSD).

The external memory 234 may include a flash drive a compact flash (CF), a secure digital (SD), a micro-secure digital (Micro-SD), a mini-secure digital (Mini-SD), an extreme digital (xD), a multi-media card (MMC), a memory stick, or the like. The external memory 234 may be functionally and/or physically connected to the electronic device 201 through various interfaces.

For example, the sensor module 240 may measure a physical quantity or may detect an operation state of the electronic device 201, and may convert the measured physical quantity or the detected operation state into an electrical signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a red, green, and blue (RGB) sensor 240H, a biometric sensor 240I, a temperature/humidity sensor 240J, an illuminance sensor 240K, and an ultraviolet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. The electronic device 201 may further include a processor configured to control the sensor module 240 as a part of or separately from the processor 210, and may control the sensor module 240 while the processor 210 is in a sleep state.

The input device 250 may include a touch panel 252, a (digital) pen sensor 254, a key 256, and an ultrasonic input unit 258.

The touch panel 252 may use at least one of a capacitive scheme, a resistive scheme, an infrared scheme, and an acoustic wave scheme. Also, the touch panel 252 may further include a control circuit. The touch panel 252 may further include a tactile layer and may provide a tactile response to the user.

The (digital) pen sensor 254 may include a recognition sheet which is a part of the touch panel or is separated from the touch panel.

The key 256 may be, for example, a physical button, an optical key, and a keypad. The ultrasonic input unit 258 may sense an ultrasonic wave generated by an input means through a microphone 288, and may identify data corresponding to the sensed ultrasonic wave.

The display 260 may include a panel 262, a hologram unit 264, and a projector 266. The panel 262 may include a configuration identical or similar to that of the display 160 illustrated in FIG. 1.

The panel 262 may be implemented to be, for example, flexible, transparent, or wearable. The panel 262 and the touch panel 252 may be implemented as one module.

The hologram unit 264 may display a three-dimensional image in the air by using the interference of light.

The projector 266 may display an image by projecting light onto a screen. The screen may be located inside or outside the electronic device 201. The display 260 may further include a control circuit for controlling the panel 262, the hologram unit 264, or the projector 266.

The interface 270 may include a high-definition multimedia interface (HDMI) 272, a universal serial bus (USB) 274, an optical interface 276, and a d-subminiature (D-sub) 278. The interface 270 may be included in the communication interface 170 illustrated in FIG. 1. Additionally or alternatively, the interface 270 may include a mobile high-definition link (MHL) interface, a SD card/MMC interface, or an infrared data association (IrDA) standard interface.

The audio module 280 may bi-directionally convert between a sound and an electrical signal. At least some elements of the audio module 280 may be included in the input/output interface 150 illustrated in FIG. 1. The audio module 280 may process sound information which is input or output through a speaker 282, a receiver 284, an earphone 286, or the microphone 288.

The camera module 291 is a device capable of capturing a still image and a moving image. The camera module 291 may include one or more image sensors (e.g., a front sensor or a back sensor), a lens, an image signal processor (ISP), and a flash (e.g., an LED, a xenon lamp, or the like).

The power management module 295 may manage power of the electronic device 201. The electronic device 201 may be supplied with power from a battery, but is not limited thereto. The power management module 295 may include a power management integrated circuit (PMIC), a charger IC, or a battery gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity, a voltage, a current, or a temperature during the charging of the battery 296. Examples of the battery 296 may include a rechargeable battery and a solar battery.

The indicator 297 may display a particular state (e.g., a booting state, a message state, a charging state, or the like) of the electronic device 201 or a part of the electronic device 201 (e.g., the processor 210).

The motor 298 may convert an electrical signal into a mechanical vibration, and may generate a vibration, a haptic effect, or the like.

The electronic device 201 may include a processing unit (e.g., a GPU) for supporting a mobile television (TV). The processing unit for supporting a mobile TV may process media data according to a standard, such as digital multimedia broadcasting (DMB), digital video broadcasting (DVB), or mediaFLO™.

Each of the above-described elements of hardware according to the present disclosure may be configured with one or more components, and the names of the corresponding elements may vary based on the type of electronic device. The electronic device may include at least one of the aforementioned elements. Some elements may be omitted or other additional elements may be further included in the electronic device. Also, some of the elements of the electronic device may be combined into one entity, which may perform functions identical to those of the relevant elements before the combination.

Figure 3:
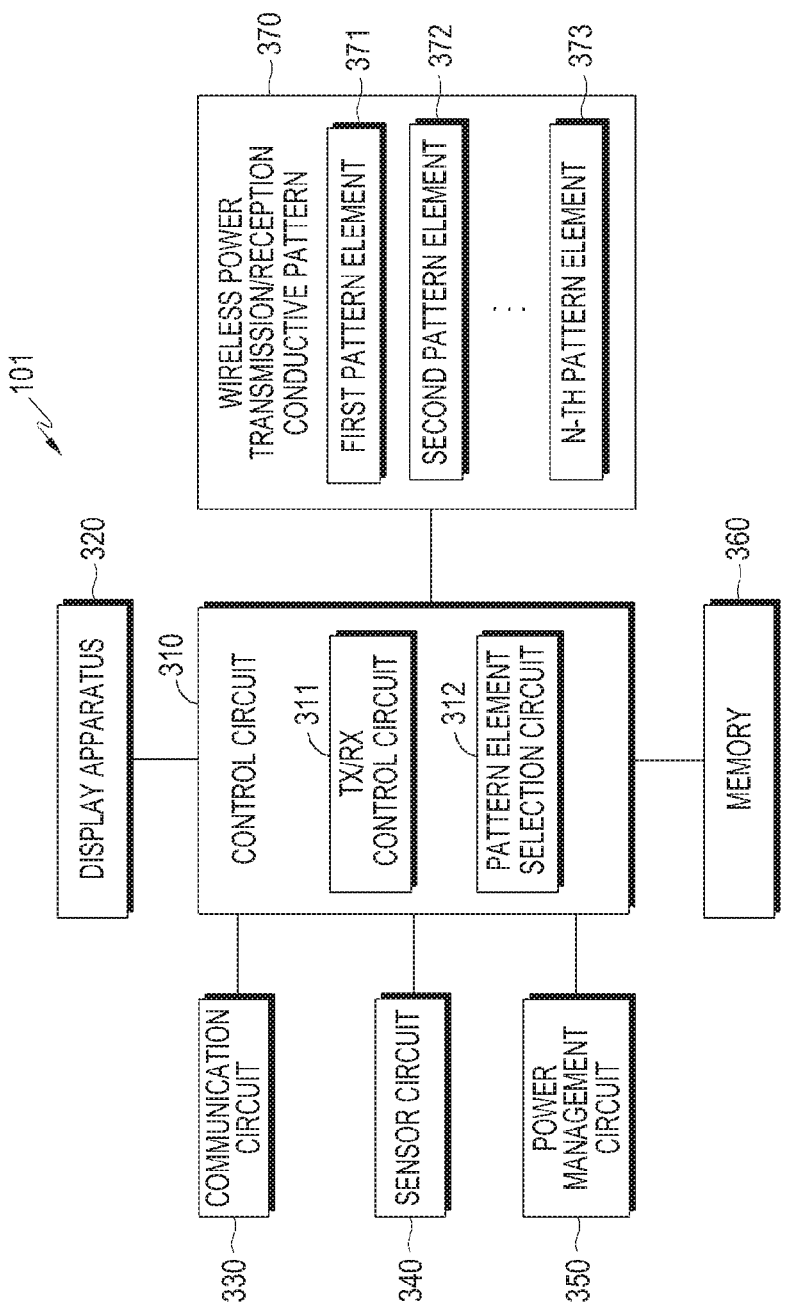
FIG. 3 is a block diagram of a configuration of an electronic device for controlling wireless charging, according to an embodiment of the present disclosure.

FIG. 3 is a block diagram of a configuration of an electronic device for controlling wireless charging, according to an embodiment of the present disclosure.

Referring to FIG. 3, the electronic device 101 is shown. The electronic device 101 may be charged by receiving a voltage, which is applied to the electronic device 101 by a charging device, or may charge another external electronic device, such as the first external electronic device 102. The electronic device 101 is a mobile terminal capable of performing such wireless charging reception or wireless charging transmission, and may be provided with at least one wireless power transmission/reception conductive pattern element (e.g., a wireless charging coil). Examples of the electronic device 101 may include a smart phone, a tablet PC, a three-dimensional (3D)-TV, a smart TV, an LED TV, an LCD TV, a table PC, an electronic board, and the like, and in addition, may include all devices capable of communicating with a peripheral device or another terminal located at a long distance. Also, the electronic device 101 according to various embodiments of the present disclosure may be mounted on various objects, such as furniture, a table, a desk, and the like.

The electronic device 101 may include a control circuit 310, a display apparatus 320, a communication circuit 330, a sensor circuit 340, a power management circuit 350, a memory 360, and a wireless power transmission/reception conductive pattern 370. The electronic device 101 may include multiple power transmission/reception conductive patterns required to wirelessly charge various external electronic devices. The power transmission/reception conductive pattern may include a coil, an antenna, and the like that may wirelessly transmit/receive power, and may have various forms, such as a spiral and the like. When the electronic device 101 senses the first external electronic device 102, the electronic device 101 may select a wireless power transmission/reception conductive pattern element corresponding to the sensed external electronic device among multiple wireless power transmission/reception conductive pattern elements, and may charge the first external electronic device 102 by using the selected wireless power transmission/reception conductive pattern element.

The display apparatus 320 may include multiple wireless power transmission/reception conductive pattern elements. The display apparatus 320 may include or may not include at least one shielding material for shielding a magnetic field due to a wireless power transmission/reception conductive pattern element. The display apparatus 320 may display placement information on the wireless power transmission/reception conductive pattern element selected in response to sensing the first external electronic device 102, for indicating a placement location for the sensed first external electronic device 102. The display apparatus 320 may perform a display under the control of the control circuit 310. The display apparatus 320 may display a screen in a remaining area other than an area corresponding to where the sensed first external electronic device 102 is placed on the display apparatus 320. For example, the display apparatus 320 may display information, which indicates that the first external electronic device 102 is being charged, in a part of the remaining area. As another example, the display apparatus 320 may display guide information so that the first external electronic device 102 may be placed to correspond to the placement information. The display apparatus 320 may be identical to the display 160 illustrated in FIG. 1, or may perform at least one function or operation performed by the display 160.

The communication circuit 330 may include a mobile communication module and a sub-communication module that performs short-range communication with a WLAN. The communication circuit 330 may communicate with the first external electronic device 102 by using at least one antenna according to the control of the control circuit 310. The communication circuit 330 may transmit/receive a wireless signal for a voice call, a video call, a short message service (SMS), or a multimedia message service (MMS) to/from a mobile phone, a smart phone, a tablet PC, or another device, which has a telephone number input to the electronic device 101. The communication circuit 330 may include at least one of a WLAN module and a short-range communication module, and may communicate with the first external device 102 through the module. The electronic device 101 may sense the first external electronic device 102 that is required to be charged or accessed for charging, through the communication circuit 330. The communication circuit 330 may be identical to the communication interface 170 illustrated in FIG. 1, or may perform at least one function or operation performed by the communication interface 170.

The sensor circuit 340 may include at least one sensor that detects a state of the electronic device 101. The sensor circuit 340 may sense at least one of the shaking of the electronic device 101 and a pressure applied to the electronic device 101. The sensor circuit 340 may include a proximity sensor that detects whether the first external electronic device 102 is close to the electronic device 101, an illuminance sensor that detects the amount of light around the electronic device 101, a motion sensor that detects the motion of the electronic device 101 (e.g., the rotation of the electronic device 101, or acceleration or vibration applied to the electronic device 101), a geomagnetic sensor that detects a point of a compass by using the Earth's magnetic field, a gravity sensor that detects a working direction of gravity, and an altimeter that measures an atmospheric pressure and detects an altitude. At least one sensor may detect the state of the electronic device 101, may generate a signal corresponding to the detection, and may deliver the generated signal to the control circuit 310. The sensor circuit 340 may include a sensor capable of sensing a pressure or weight generated when the first external electronic device 102 is placed on the display apparatus 320. According to the performance of the electronic device 101, sensors may be added to or removed from the sensor circuit 340. The sensor circuit 340 may be identical to the sensor module 240 illustrated in FIG. 2, or may perform at least one function or operation performed by the sensor module 240.

The power management circuit 350 may supply power to one or multiple batteries disposed in the housing of the electronic device 101. The one battery or multiple batteries, that may be included in the power management circuit 350, may supply power to the electronic device 101. The power management circuit 350 may supply power, which is provided by an external power source, to the electronic device 101 through a wired cable. The power management circuit 350 may supply power, which is wirelessly provided by an external power source, to the electronic device 101 by using wireless charging technology. The power management circuit 350 may supply power to the first external electronic device 102 through wireless charging. The power management circuit 350 may supply power to the first external electronic device 102 in response to at least one of the multiple wireless power transmission/reception conductive pattern elements included in the electronic device 101, or may be supplied with power from a charger. The power management circuit 350 may be identical to the power management module 295 illustrated in FIG. 2, or may perform at least one function or operation performed by the power management module 295.

The memory 360 may store signals or data which are input/output in response to operations of the display apparatus 320, the communication circuit 330, the sensor circuit 340, and the wireless power transmission/reception conductive pattern 370. The memory 360 may store control programs and applications for controlling the electronic device 101 or the control circuit 310. The memory 360 may include a memory card (e.g., an SD card and a memory stick) mounted on the electronic device 101. Examples of the memory 360 may include a non-volatile memory, a volatile memory, a hard disk drive (HDD), and an SSD. The memory 360 may be identical to the memory 130 illustrated in FIG. 1, or may perform at least one function or operation performed by the memory 130.

The wireless power transmission/reception conductive pattern 370 may include multiple wireless power transmission/reception conductive pattern elements 371, 372, and 373 that may transmit/receive power. The wireless power transmission/reception conductive pattern 370 may be configured in one layer in the display apparatus 320. The power transmission/reception conductive pattern 370 may include a coil, an antenna, and the like that may wirelessly transmit/receive power, and may have various forms, such as a spiral and the like. The wireless power transmission/reception conductive pattern elements 371, 372, and 373 may have different sizes according to the placement of an external electronic device on the electronic device 101. A wireless power transmission/reception conductive pattern element, which corresponds to the first external electronic device 102, among the wireless power transmission/reception conductive pattern elements 371, 372, and 373, may be activated and may cause power to be transmitted/received, and the remaining wireless power transmission/reception conductive pattern elements 371, 372, and 373 may be deactivated. For example, when the first external electronic device 102 is placed to correspond to an optional wireless power transmission/reception conductive pattern element, the transmission or reception of power may be started through the relevant wireless power transmission/reception conductive pattern element. The wireless power transmission/reception conductive pattern elements 371, 372, and 373 may all have an identical inductance value in order to satisfy a frequency used for wireless charging. The respective wireless power transmission/reception conductive pattern elements 371, 372, and 373 may have different inductance values so as to charge different devices. For example, when the wireless power transmission/reception conductive pattern elements 371, 372, and 373 all have an identical inductance value, a resonance condition may be satisfied. Under the control of the control circuit 310, the wireless power transmission/reception conductive pattern elements 371, 372, and 373 may operate in a wireless power transmission mode which allows the transmission/reception of wireless power to be provided to the first external electronic device 102, or may operate in a wireless power reception mode which allows the electronic device 101 to be supplied with wireless power from an external wireless power transmission electronic device.

The control circuit 310 may perform or control calculations or data processing related to control over and communication by at least one of the other elements of the electronic device 101, and/or a charging transmission/reception mode of the wireless power transmission/reception conductive pattern elements 371, 372, and 373. The control circuit 310 may control multiple hardware or software elements connected to the control circuit 310 by running an OS or the applications 147, and may perform the processing of and arithmetic operations on various data. The control circuit 310 may be implemented by a SoC. The control circuit 310 may further include a GPU and/or an image signal processor. The control circuit 310 may load, into a volatile memory of the memory 360, instructions or data received from at least one (e.g., a non-volatile memory) of the other elements of the electronic device 101 and may process the loaded instructions or data, and may store various data in a non-volatile memory of the memory 360. The control circuit 310 may include a Tx/Rx control circuit 311 capable of selecting or controlling at least one of the wireless power transmission mode for wirelessly supplying power to an external electronic device and the wireless power reception mode for receiving power from an external wireless power transmission device, and a wireless power transmission/reception conductive pattern element selection circuit 312 that selects a wireless power transmission/reception conductive pattern element corresponding to the first external electronic device 102 among the multiple wireless power transmission/reception conductive pattern elements.

The control circuit 310 may sense the first external electronic device 102, may select a wireless power transmission/reception conductive pattern element corresponding to the sensed first external electronic device 102, among the multiple wireless power transmission/reception conductive pattern elements 371, 372, and 373, and may control the charging of the first external electronic device 102 by using the selected wireless power transmission/reception conductive pattern element. When the control circuit 310 senses the first external electronic device 102, the control circuit 310 may control a display by the display apparatus 320. The control circuit 310 may receive a signal from the communication circuit 330 that transmits/receives a signal to/from the first external electronic device 102, and may sense the first external electronic device 102. The control circuit 310 may receive a signal from the sensor circuit 340 that senses the placement of the first external electronic device 102 on the display apparatus 320, and may sense the first external electronic device 102 on the basis of the received signal. When the control circuit 310 senses the first external electronic device 102 on the basis of a signal received from at least one of the communication circuit 330 and the sensor circuit 340, the control circuit 310 may control a display by the display apparatus 320. The control circuit 310 may control the display apparatus 320 to perform different displays in response to the type of the sensed first external electronic device 102.

The control circuit 310 may control the display apparatus 320 to display placement information on the selected wireless power transmission/reception conductive pattern element. The control circuit 310 may select a wireless power transmission/reception conductive pattern element, which corresponds to the sensed first external electronic device 102 among the multiple wireless power transmission/reception conductive pattern elements 371, 372, and 373 included in the display apparatus 320, in response to the sensed first external electronic device 102. When the control circuit 310 selects the wireless power transmission/reception conductive pattern element, the control circuit 310 may control the display apparatus 320 to display the placement information on the selected wireless power transmission/reception conductive pattern element. Alternatively, when the first external electronic device 102 is sensed, the control circuit 310 may control the display apparatus 320 to display placement information on a wireless power transmission/reception conductive pattern element corresponding to the sensed first external electronic device 102. When the first external electronic device 102 is sensed, the control circuit 310 may output information, which corresponds to the sensed first external electronic device 102, by using at least one of a voice, graphics, text, and vibration. The placement information may include coordinate information and edge information (e.g., information representing edges of a quadrangle) at which the first external electronic device 102 is to be placed on the display apparatus 320.

When the first external electronic device 102 is placed on the display apparatus 320 to correspond to the placement information, the control circuit 310 may perform a control operation for displaying a screen, which is displayed by the display apparatus 320, in a remaining area other than an area corresponding to the placed first external electronic device 102. The control circuit 310 may sense whether the first external electronic device 102 is placed to correspond to the placement information. When the first external electronic device 102 is placed to correspond to the placement information, the control circuit 310 may control the display apparatus 320. For example, the control circuit 310 may display a screen, which has been displayed by the display apparatus 320 before the first external electronic device 102 is sensed, in another area other than an area in which the first external electronic device 102 is placed on the display apparatus 320. The control circuit 310 may display, in a part of the remaining area, information that indicates that the first external electronic device 102 is being charged according to the placement of the first external electronic device 102. For example, the control circuit 310 may display the information that indicates that the first external electronic device 102 is being charged, in a partial area.

The control circuit 310 may sense that the device to be charged is not placed to correspond to the placement information. When the first external electronic device 102 is not placed in response to the placement information, the control circuit 310 may display guide information so that the first external electronic device 102 may be placed to correspond to the placement information. When the first external electronic device 102 is not placed to correspond to the placement information, the control circuit 310 may control the display apparatus 320 to display the placement information. For example, when the first external electronic device 102 is not placed to correspond to the placement information, the control circuit 310 may control the display apparatus 320 to display information which notifies a user that the first external electronic device 102 needs to be placed to correspond to the placement information, and the information may include an arrow indicating a position at which the placement information is displayed.

The control circuit 310 may determine the type of the sensed first external electronic device 102, may activate a wireless power transmission/reception conductive pattern element corresponding to the first external electronic device 102, and may deactivate the remaining wireless power transmission/reception conductive pattern elements 371, 372, and 373. The control circuit 310 may determine the type of the first external electronic device 102 in response to the sensing of the first external electronic device 102. In response to the sensing of the first external electronic device 102, the control circuit 310 may determine whether the first external electronic device 102 is a smart watch, is another electronic device having a size similar to that of the electronic device 101, or is another device capable of being wirelessly charged. For example, when the first external electronic device 102 has a size similar to that of the electronic device 101, the control circuit 310 may activate the multiple wireless power transmission/reception conductive pattern elements 371, 372, and 373 included in the wireless power transmission/reception conductive pattern 370, and may supply power or may be supplied with power. The control circuit 310 may control a charging transmission mode which allows the electronic device 101 to provide charging to the first external electronic device 102 and a wireless power reception mode which allows the electronic device 101 to be supplied with wireless power from an external wireless power transmission electronic device. The control circuit 310 may activate at least one wireless power transmission/reception conductive pattern element included in the wireless power transmission/reception conductive pattern 370, and may control the electronic device 101 to operate in a charging transmission mode or a charging reception mode. Alternatively, the control circuit 310 may supply power to the first external electronic device 102 through the at least one wireless power transmission/reception conductive pattern element included in the wireless power transmission/reception conductive pattern 370, and may be supplied with power from an external wireless power transmission electronic device through the another wireless power transmission/reception conductive pattern element.

An electronic device for controlling transmission/reception of wireless power may include a display apparatus that displays a screen; and a control circuit that senses at least one external electronic device, selects a wireless power transmission/reception conductive pattern element corresponding to the sensed at least one external electronic device among multiple wireless power transmission/reception conductive pattern elements, and controls transmission/reception of wireless power to/from the relevant external electronic device by using the selected wireless power transmission/reception conductive pattern element.

The control circuit may control a display by the display apparatus when the external electronic device is sensed.

The control circuit may display placement information on the selected wireless power transmission/reception conductive pattern element through the display apparatus.

The control circuit may display a screen, which is displayed by the display apparatus, in another area except for an area corresponding to the sensed external electronic device when the external electronic device is placed to correspond to the placement information.

The control circuit may display information, which indicates that the external electronic device is being charged, in a part of the other area.

The control circuit may output guide information so that the external electronic device is placed to correspond to the placement information, when the external electronic device is not placed in response to the placement information.

The electronic device may further include at least one of a communication circuit that transmits/receives a signal to/from the external electronic device in order to sense the external electronic device; and a sensor circuit that senses placement of the external electronic device on the display apparatus.

The control circuit may determine information of the sensed external electronic device, may activate the wireless power transmission/reception conductive pattern element corresponding to the external electronic device, and may deactivate the remaining wireless power transmission/reception conductive pattern elements.

The control circuit may control a wireless charging transmission mode which allows the electronic device to provide wireless charging to the external electronic device, and a wireless charging reception mode which allows the electronic device to receive charging from a wireless power transmission electronic device.

According to various embodiments of the present disclosure, when the number of the sensed external electronic devices is plural, the control circuit may select the wireless power transmission/reception conductive pattern elements respectively corresponding to the external electronic devices, and may display a screen, which is displayed by the display apparatus, in another area except for an area corresponding to the sensed multiple external electronic devices.

An electronic device may include a housing; a communication circuit that is disposed within the housing; a display module that is disposed on one surface of the housing; multiple conductive pattern elements that are disposed within the housing; a processor that is electrically connected to the display module and the multiple conductive pattern elements; and a memory that is electrically connected to the processor, wherein the memory may store instructions that, when executed by the processor, cause the processor to sense that an external device is adjacent to a first area of the display module, to wirelessly transmit power to the external device by using at least some of the multiple conductive pattern elements corresponding to the first area in response to the sensing, and to display a screen by using a second area of the display module.

The at least some of the multiple conductive pattern elements may be configured to be transparent.

The instructions may cause the processor to deactivate the first area of the display module.

An apparatus may include a housing; a first conductive pattern element and a second conductive pattern element configured to be disposed within the housing and to wirelessly transmit power; at least one user interface that is disposed inside of the housing or on one surface thereof; a processor that is electrically connected to the first and second conductive pattern elements and the at least one user interface; and a memory that is electrically connected to the processor, wherein the memory may store instructions that, when executed by the processor, cause the processor to monitor whether an external device is adjacent to the first and second conductive pattern elements, to at least partially respond to a result of the monitoring and to provide, through the user interface, an indication representing that the external device is capable of being charged by using one conductive pattern element selected from the first and second conductive pattern elements, and to wirelessly supply power to the external device through the selected one conductive pattern element.

The user interface may include at least one of a Light-Emitting Diode (LED), a display, a speaker, and a vibration element.

An apparatus may include a housing; a first conductive pattern element and a second conductive pattern element configured to be disposed within the housing and to wirelessly transmit power; at least one user interface that is disposed inside of the housing or on one surface thereof; and a circuit that is electrically connected to the first and second conductive pattern elements and the at least one user interface, wherein the circuit may be configured to monitor whether an external device is adjacent to the first and second conductive pattern elements, to at least partially respond to a result of the monitoring and to provide, through the user interface, an indication representing that the external device is capable of being charged by using one conductive pattern element selected from the first and second conductive pattern elements, and to wirelessly supply power to the external device through the selected one conductive pattern element.

Figure 4:
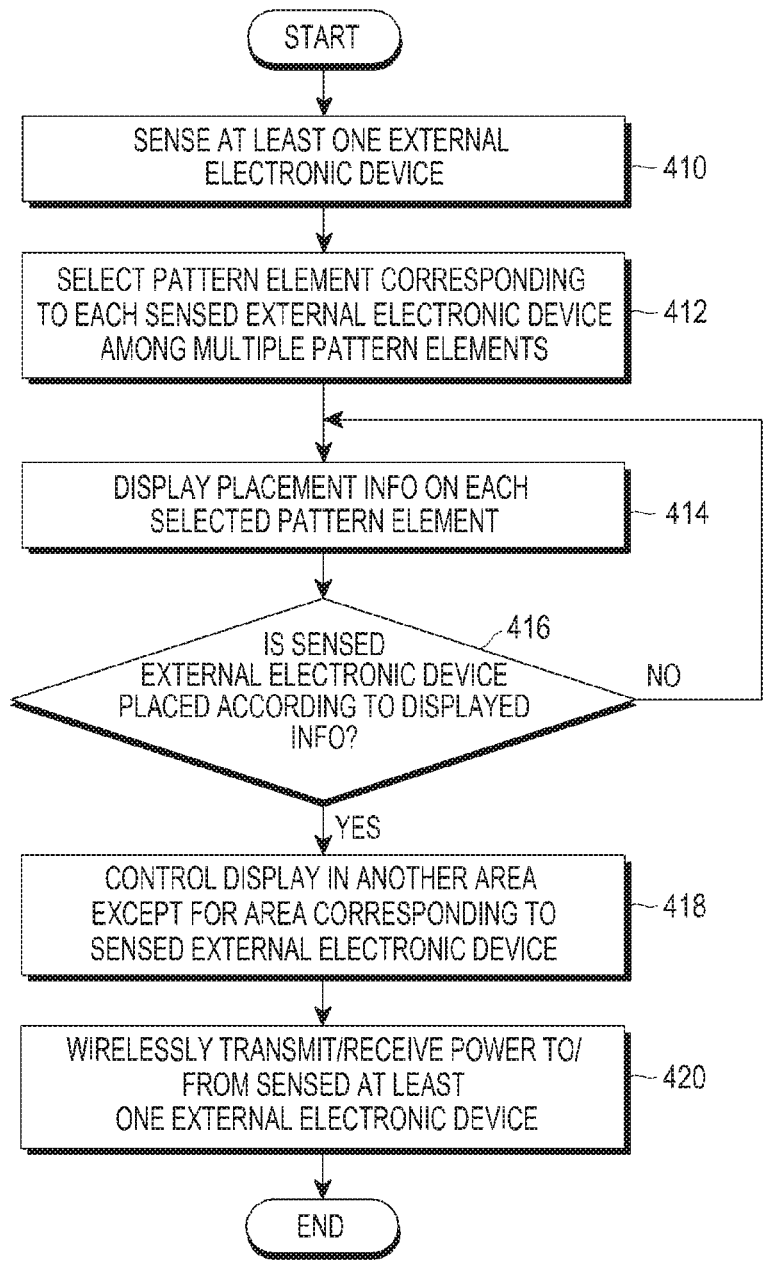
FIG. 4 is a flowchart of a process for controlling wireless charging by an electronic device, according to an embodiment of the present disclosure.

FIG. 4 is a flowchart of a process for controlling wireless charging by an electronic device, according to an embodiment of the present disclosure.

Referring to FIG. 4, in step 410, the electronic device 101 may sense a first external electronic device 102. The electronic device 101 may receive a signal, which corresponds to the sensing, from the communication circuit 330 that transmits/receives a signal to/from the first external electronic device 102, and may sense the first external electronic device 102 on the basis of the received signal. For example, the electronic device 101 may detect the first external electronic device 102 in an in-band scheme or an out-band scheme through the communication circuit 330. An in-band communication scheme signifies that a wireless power supply device and an electronic device communicate with each other at a frequency identical to that used to transmit wireless power. An out-band communication scheme signifies that the wireless power supply device and the electronic device communicate with each other by using a frequency different from a frequency used to transmit power. The out-band communication scheme may be a short-range communication protocol (e.g., BT, Wi-Fi, NFC, etc.). When the electronic device 101 senses the first external electronic device 102, the electronic device 101 may receive information (e.g., maximum power, the current amount of battery power, manufacturer information, etc.) of the first external electronic device 102 through in-band or out-band communication. As another example, the electronic device 101 may receive a signal, which corresponds to the sensing, from the sensor circuit 340 that senses the placement of the first external electronic device 102 on the display apparatus 320, and may sense the first external electronic device 102 on the basis of the received signal. The electronic device 101 may sense the first external electronic device 102 on the basis of a signal received from at least one of the communication circuit 330 and the sensor circuit 340. When the first external electronic device 102 has been sensed, the electronic device 101 may control the display of a screen displayed by the display apparatus 320. When the first external electronic device 102 has been sensed, the electronic device 101 may control the display apparatus 320 to perform different displays in response to the information of the sensed first external electronic device 102.

In step 412, the electronic device 101 may select a wireless power transmission/reception conductive pattern element corresponding to the sensed first external electronic device 102 among the multiple wireless power transmission/reception conductive pattern elements 371, 372, and 373, which are included in the display apparatus 320 of the electronic device 101, on the basis of the information of the sensed first external electronic device 102. The wireless power transmission/reception conductive pattern elements 371, 372, and 373 included in the display apparatus 320 may have various sizes or forms in order to support various external electronic devices. The electronic device 101 may select or determine the wireless power transmission/reception conductive pattern element, which corresponds to the sensed first external electronic device 102 among the multiple wireless power transmission/reception conductive pattern elements 371, 372, and 373, on the basis of the information (e.g., size and form) of the first external electronic device 102.

In step 414, the electronic device 101 may display placement information on the selected wireless power transmission/reception conductive pattern element. For example, when the first external electronic device 102 has been sensed, the electronic device 101 may display the placement information on the selected wireless power transmission/reception conductive pattern element through the display apparatus 320 on the basis of the information of the sensed first external electronic device 102. As another example, when the first external electronic device 102 has been sensed, the electronic device 101 may output, in a voice, placement information on a conductive pattern element capable of providing the transmission/reception of wireless power to the sensed first external electronic device 102. The placement information may include coordinate information and edge information (e.g., information representing edges of a quadrangle) at which the first external electronic device 102 is to be placed on the display apparatus 320.

In step 416, the electronic device 101 may determine whether the first external electronic device 102 is placed based on the provided placement information.

When it is determined in step 416 that the device to be charged is not placed to correspond to the placement information, the electronic device 101 may perform step 414. For example, when the device to be charged is not placed to correspond to the placement information, the electronic device 101 may provide information to a user so that the device to be charged may be placed to correspond to the placement information. The information may include a voice output, LED display, vibration, and the like which are used to display an arrow indicating a position, at which the placement information is displayed, on the display apparatus 320.

When it is determined in step 416 that the device to be charged is placed to correspond to the placement information, the electronic device 101 may perform step 418.

In step 418, the electronic device 101 may control the display of a screen in a remaining area except for an area in which the first external electronic device 102 has been sensed on the display apparatus 320.

For example, the electronic device 101 may display a screen, which has been displayed by the display apparatus 320 before the first external electronic device 102 is sensed, in a remaining area other than an area in which the first external electronic device 102 is placed on the display apparatus 320. As another example, the electronic device 101 may display information, which indicates that the first external electronic device 102 is being charged according to the placement of the first external electronic device 102, in a part of the remaining area.

In step 420, the electronic device 101 may wirelessly transmit/receive power to/from the sensed first external electronic device 102.

The electronic device 101 may sense a change of a placement position of the first external electronic device 102 while the electronic device 101 wirelessly transmits/receives power. The electronic device 101 may sense a change of a placement position of the first external electronic device 102 on the basis of information received from the first external electronic device 102. For example, when information on the amount of transmitted power is different from information on the amount of power that the first external electronic device 102 has received, or the amount of power received from the first external electronic device 102, the electronic device 101 may determine a change of a position of the first external electronic device 102. As another example, when the electronic device 101 newly senses the first external electronic device 102 through at least one coil of the electronic device 101, the electronic device 101 may determine the movement of the first external electronic device 102.

When it is determined that the position of the first external electronic device 102 is changed while the electronic device 101 wirelessly transmits/receives power, the electronic device 101 may again perform step 414.

A method for controlling transmission/reception of wireless power by an electronic device may include sensing at least one external electronic device; selecting a wireless power transmission/reception conductive pattern element corresponding to the sensed at least one external electronic device among multiple wireless power transmission/reception conductive pattern elements; and transmitting/receiving wireless power to/from the relevant external electronic device by using the selected wireless power transmission/reception conductive pattern element.

The method may further include displaying placement information on the wireless power transmission/reception conductive pattern element through a display apparatus.

The method may further include controlling a display by the display apparatus when the external electronic device is sensed.

The method may include displaying a screen, which is displayed by the display apparatus, in another area except for an area corresponding to the sensed external electronic device when the external electronic device is placed to correspond to the placement information.

The other area may be an area in which a screen, which is output by at least one function provided by the electronic device, is displayed.

The displaying of the screen in the other area may include displaying information, which indicates that the external electronic device is being charged, in a part of the other area.

The method may include outputting guide information so that the external electronic device is placed to correspond to the placement information, when the external electronic device is not placed in response to the placement information.

The sensing of the at least one external electronic device may include sensing the external electronic device through at least one of sensing using a signal transmitted/received to/from the external electronic device and sensing due to placement of the external electronic device on the display apparatus.

The method may further include determining information of the sensed external electronic device.

The selecting of the wireless power transmission/reception conductive pattern element may include: activating the wireless power transmission/reception conductive pattern element corresponding to the external electronic device; and deactivating the remaining wireless power transmission/reception conductive pattern elements.

The method may further include: when the number of the sensed external electronic devices is plural, selecting the wireless power transmission/reception conductive pattern elements respectively corresponding to the external electronic devices; and displaying a screen, which is displayed by the display apparatus, in another area except for an area corresponding to the sensed multiple external electronic devices.

The placement information may include coordinate information at which the external electronic device is to be placed.

Figures 5A, 5B:
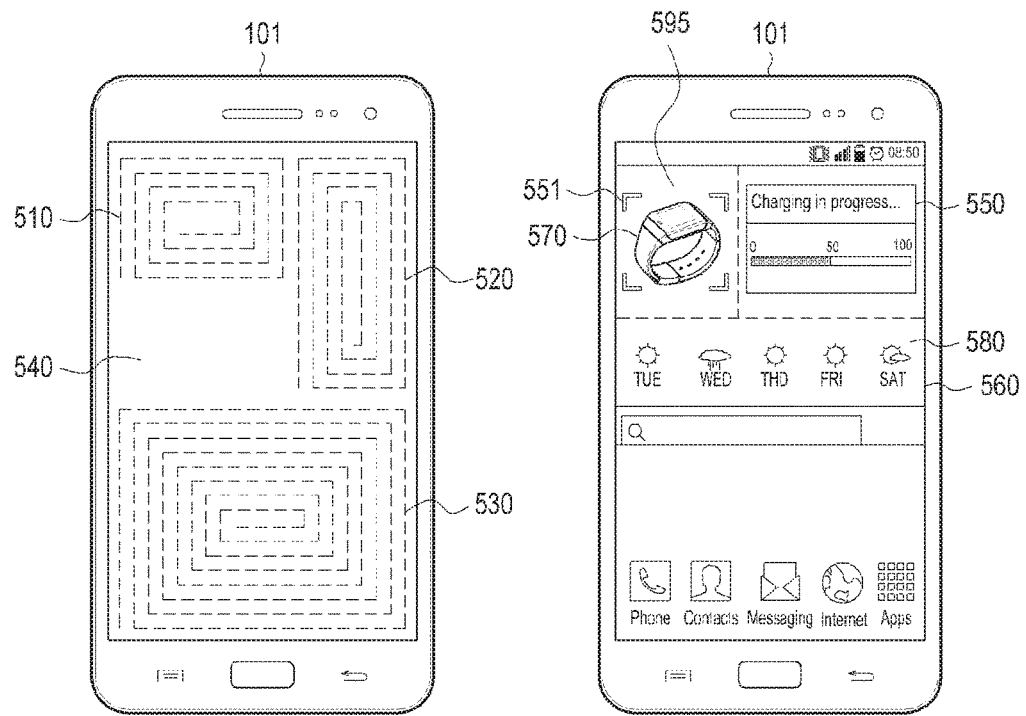
FIG. 5A illustrates multiple wireless power transmission/reception conductive pattern elements formed in an electronic device, according to an embodiment of the present disclosure.
FIG. 5B illustrates a screen of an electronic device displaying a result of placing a wireless power transmission/reception electronic device on the electronic device, according to an embodiment of the present disclosure.

FIG. 5A illustrates multiple wireless power transmission/reception conductive pattern elements formed in an electronic device, according to an embodiment of the present disclosure. FIG. 5B illustrates a screen of an electronic device displaying a result of placing a wireless power transmission/reception electronic device on the electronic device, according to an embodiment of the present disclosure.

Referring to FIG. 5A, the electronic device 101 includes a display apparatus 540 configured to include multiple wireless power transmission/reception conductive pattern elements 510, 520, and 530 The electronic device 101 may be an electronic device (e.g., a smart phone and a mobile phone) having such a size that a user can hold the electronic device with one hand. The multiple wireless power transmission/reception conductive pattern elements 510, 520, and 530 configured in the electronic device 101 may have different forms (e.g., sizes, shapes, etc.) in order to support external wireless power transmission/reception electronic devices of various types (e.g., a smart phone, a wearable device, etc.) and various forms (e.g., sizes, shapes, thicknesses, etc.). The multiple wireless power transmission/reception conductive pattern elements 510, 520, and 530 may be formed at optimal positions in order to wirelessly transmit/receive power to/from an external electronic device 570 that is placed on the display apparatus 540. The multiple wireless power transmission/reception conductive pattern elements 510, 520, and 530 that are indicated by dotted lines, may be configured in one layer in a display apparatus described below with reference to FIG. 8.

The electronic device 101 may sense an external wireless power transmission/reception electronic device, such as the external electronic device 570, through the communication circuit 330 or the sensor circuit 340. For example, the electronic device 101 may receive a proximity signal or a wireless power transmission request signal from the external electronic device 570 through the communication circuit 330. As another example, when the external electronic device 570 is placed on the display apparatus 540, the electronic device 101 may sense the external electronic device 570 by measuring a pressure or weight through the sensor circuit 340. Although only three wireless power transmission/reception conductive pattern elements are illustrated in FIG. 5A, this configuration is for illustrative purposes only, and according to an embodiment of the present disclosure, one, two, or at least four wireless power transmission/reception conductive pattern elements may be formed. Also, each of the wireless power transmission/reception conductive pattern elements may operate in a power transmission mode or a power reception mode according to the control of the control circuit 310.

Referring to FIG. 5B, when the external electronic device 570 is sensed, the electronic device 101 may control a display by a display apparatus 540. The electronic device 101 may sense whether the external electronic device 570 is placed to correspond to placement information 551. When the external electronic device 570 is placed to correspond to the placement information 551, the electronic device 101 may display a screen, which is displayed by the display apparatus 540, in an area 580 other than an area 595 corresponding to the sensed external electronic device 570.

The placement information 551 may be displayed before the electronic device 101 performs wireless charging or after the electronic device 101 completes wireless charging.

The electronic device 101 may display a screen, which has been displayed by the display apparatus 540 before the external electronic device 570 is sensed, in the area 580. The electronic device 101, for example, may display content through the display apparatus 540 in such a manner as to reduce content being displayed or to change at least part of the content. The electronic device 101 may display, in a partial area 550, information which indicates that the external electronic device 570 is being charged according to the placement of the external electronic device 570. A position of the partial area 550 at which the information is displayed may be variably adjusted under control by the user. The partial area 550 including the information may include information which changes depending on a case before the execution of wireless charging or a case after the completion of charging.

The electronic device 101 may sense that the external electronic device 570 is not placed to correspond to the placement information 551. When the external electronic device 570 is not placed to correspond to the placement information 551, the electronic device 101 may control the display apparatus 560 to display information, which notifies the user that the external electronic device 570 needs to be placed to correspond to the placement information 551. For example, the electronic device 101 may notify the user of the placement information through a visual notification (e.g., arrow indication, position blinking, or the like), an auditory notification (e.g., notification through a voice output), a tactile notification (e.g., vibration), and the like which indicate a position at which the placement information is displayed.

Figure 6A:
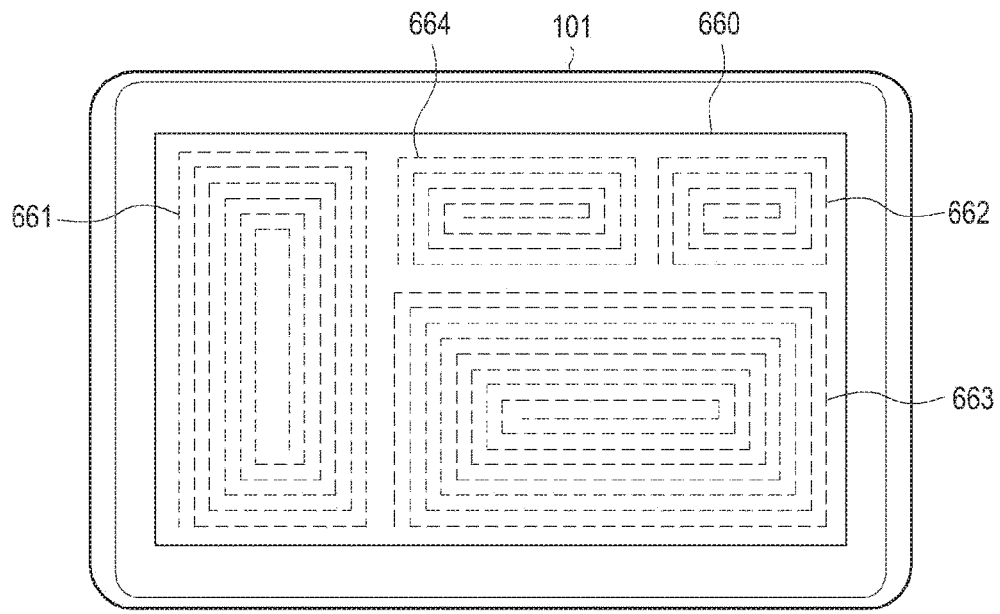
FIG. 6A illustrates multiple wireless power transmission/reception conductive pattern elements formed in an electronic device, according to an embodiment of the present disclosure.
Figure 6B:
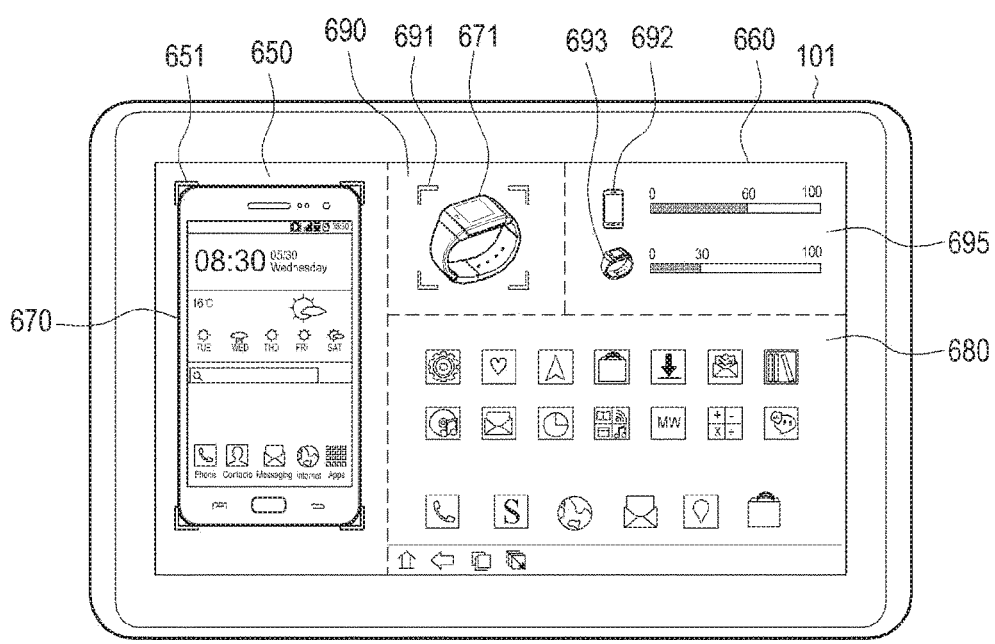
FIG. 6B illustrates a screen of an electronic device displaying a result of placing multiple wireless power transmission/reception electronic devices on the electronic device, according to an embodiment of the present disclosure.

FIG. 6A illustrates multiple wireless power transmission/reception conductive pattern elements formed in an electronic device, according to an embodiment of the present disclosure. FIG. 6B illustrates a screen of an electronic device displaying a result of placing multiple wireless power transmission/reception electronic devices on the electronic device, according to an embodiment of the present disclosure.

Referring to FIG. 6A, the electronic device 101 includes a display apparatus 660 configured to include multiple wireless power transmission/reception conductive pattern elements 661, 662, 663, and 664. The electronic device 101 may be an electronic device (e.g., a tablet PC) having such a size that the user cannot hold the electronic device with one hand. The multiple wireless power transmission/reception conductive pattern elements 661, 662, 663, and 664 configured in the electronic device 101 may have different forms (e.g., sizes, shapes, etc.) in order to support external wireless power transmission/reception electronic devices having various types (e.g., a smart phone, a wearable device, etc.) and various forms (e.g., sizes, shapes, thicknesses, etc.). The wireless power transmission/reception conductive pattern elements 661, 662, 663, and 664 may be formed at optimal positions in order to wirelessly transmit/receive power to/from multiple wireless power transmission/reception electronic devices that are placed the a display apparatus 660. For example, forms (e.g., sizes, shapes, etc.) of the wireless power transmission/reception conductive pattern elements may have positions determined based on a point which minimizes mutual interference between the wireless power transmission/reception conductive pattern elements. The multiple wireless power transmission/reception conductive pattern elements 661, 662, 663, and 664, which are indicated by dotted lines, may be configured in one layer in the display apparatus described below with reference to FIG. 8.

The electronic device 101 may sense multiple external wireless power transmission/reception electronic devices, such as first and second external electronic devices 670 and 671, through the communication circuit 330 or the sensor circuit 340. For example, the electronic device 101 may receive a proximity signal or a wireless power transmission request signal from each of the first and second external electronic devices 670 and 671 through the communication circuit 330. As another example, when each of the first and second external electronic devices 670 and 671 is placed on the display apparatus 660, the electronic device 101 may sense each of the first and second external electronic devices 670 and 671 by measuring a pressure or weight through the sensor circuit 340. Although only four wireless power transmission/reception conductive pattern elements are illustrated in FIG. 6A, this configuration is for illustrative purposes only, and according to an embodiment of the present disclosure, various numbers of wireless power transmission/reception conductive pattern elements may be formed. Also, each of the wireless power transmission/reception conductive pattern elements may operate in a wireless power transmission mode or a wireless power reception mode according to the control of the control circuit 310. The electronic device 101 including the multiple wireless power transmission/reception conductive pattern elements 661, 662, 663, and 664 may control power, which is supplied to an external electronic device, through each pattern element, and may provide a guide to an appropriate position on the basis of information of the external electronic device. For example, the electronic device 101 may provide (or output) a movement guide to an appropriate position on the basis of the information received from the external electronic device, and may utilize a remaining area to perform a display.

Referring to FIG. 6B, when the electronic device 101 senses the first and second external electronic devices 670 and 671, the electronic device 101 may control a display by the display apparatus 660. The electronic device 101 may sense whether the first external electronic device 670 is placed to correspond to first placement information 651 or whether the second external electronic device 671 is placed to correspond to second placement information 691. When the first external electronic device 670 and the second external electronic device 671 are placed to correspond to the first placement information 651 and the second placement information 691, respectively, the electronic device 101 may display a screen, which is displayed by the display apparatus 660, in an area 680 other than areas 650 and 690 corresponding to the sensed first and second external electronic devices 670 and 671, respectively.

The electronic device 101 may display a screen, which has been displayed by the display apparatus 660 before at least one of the first and second external electronic devices 670 and 671 is sensed, in such a manner as to reduce the screen or to change at least part of the screen, in an area 680 other than areas 650 and 690 in which the first and second external electronic devices 670 and 671 are placed. The electronic device 101 may display, in a partial area 695, information which indicates that the first external electronic device 670 is being charged according to the placement of the first external electronic device 670, and information which indicates that the second external electronic device 671 is being charged according to the placement of the second external electronic device 671. The electronic device 101 may sense that the first and second external electronic devices 670 and 671 are not placed to correspond to the respective pieces of placement information 651 and 691. When at least one of the first and second external electronic devices 670 and 671 is not placed in response to the respective pieces of placement information 651 and 691, the electronic device 101 may display guide information so that an external electronic device, which is not placed in response to the relevant placement information among the first and second external electronic devices 670 and 671, may be placed to correspond to the relevant placement information 651 or 691. When at least one of the first and second external electronic devices 670 and 671 is not placed in response to the respective pieces of placement information 651 and 691, the electronic device 101 may control the display apparatus 660 to display the information, which notifies the user that at least one of the first and second external electronic devices 670 and 671 needs to be placed to correspond to the relevant placement information, and the information may output a visual notification (e.g., arrow indication, position blinking, or the like), an auditory notification (e.g., notification through a voice output), a tactile notification (e.g., vibration), and the like which indicates a position at which the placement information 651 or 691 is displayed. For example, the electronic device 101 may notify the user of the placement information by using the output.

Figure 6C:
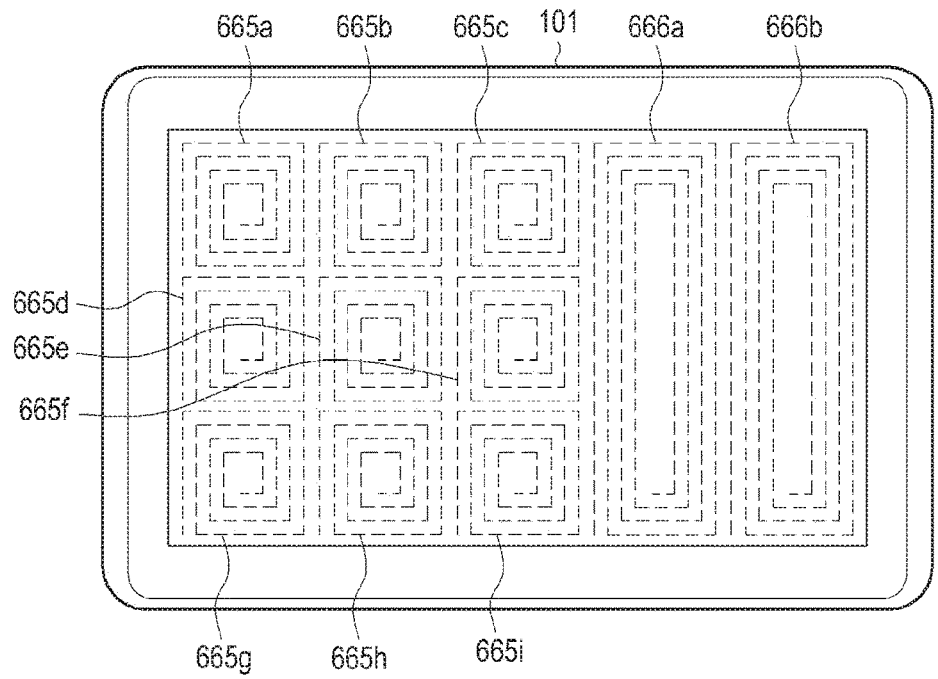
FIGS. 6C and 6D illustrate multiple wireless power transmission/reception conductive pattern elements formed in an electronic device, according to various embodiments of the present disclosure.
Figure 6D:
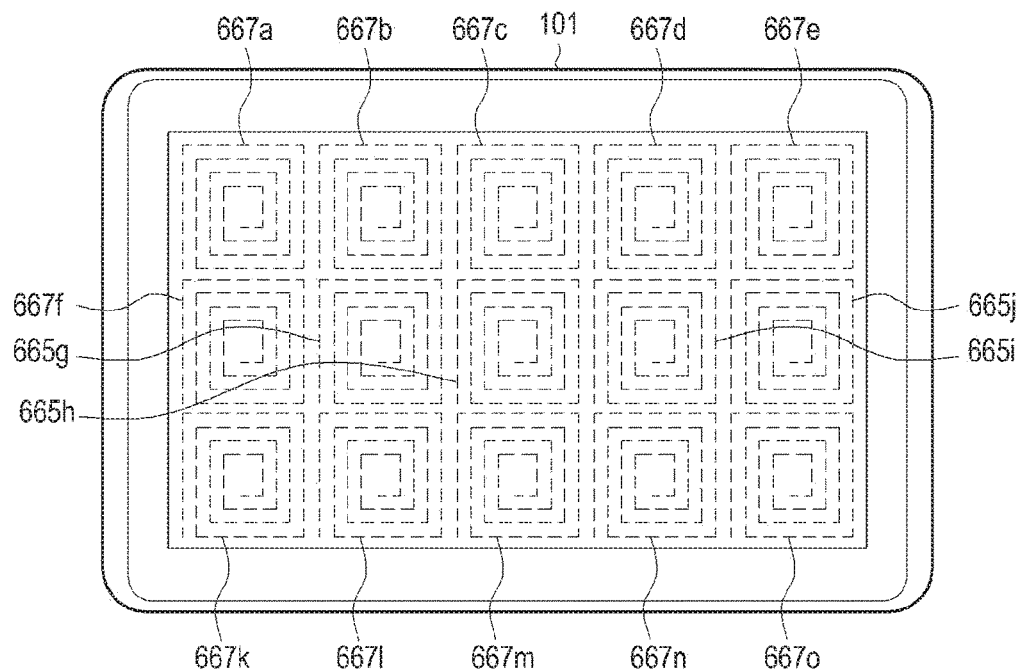

FIGS. 6C and 6D illustrate multiple wireless power transmission/reception conductive pattern elements formed in an electronic device, according to various embodiments of the present disclosure.

Referring to FIG. 6C, the electronic device 101 according to an embodiment of the present disclosure may include multiple wireless power transmission/reception conductive pattern elements 665a, 665b, 665c, 665d, 665e, 665f, 665g, 665h, 665i, 666a, and 666b. The multiple wireless power transmission/reception conductive pattern elements 665a, 665b, 665c, 665d, 665e, 665f, 665g, 665h, 665i, 666a, and 666b configured in the electronic device 101 may have different forms (e.g., sizes, shapes, etc.) in order to support external wireless power transmission/reception electronic devices of various types (e.g., a smart phone, a wearable device, etc.) and various forms (e.g., sizes, shapes, thicknesses, etc.). The wireless power transmission/reception conductive pattern elements 665a, 665b, 665c, 665d, 665e, 665f, 665g, 665h, 665i, 666a, and 666b may be formed at optimal positions in order to wirelessly transmit/receive power to/from multiple wireless power transmission/reception electronic devices that are placed on a display apparatus 660. Also, the multiple wireless power transmission/reception conductive pattern elements 665a, 665b, 665c, 665d, 665e, 665f, 665g, 665h, and 665i of the electronic device 101 may be configured in various forms according to the form of a wearable device or a portable terminal. The wireless power transmission/reception conductive pattern elements may differ from each other with respect to actually-transmitted power, and may have respective positions capable of being moved on the basis of information of external wireless power transmission/reception electronic devices. The wireless power transmission/reception conductive pattern elements 665a, 665b, 665c, 665d, 665e, 665f, 665g, 665h, and 665i may have sizes which are smaller than those of the other wireless power transmission/reception conductive pattern elements 666a and 666b. The wireless power transmission/reception conductive pattern elements 665a, 665b, 665c, 665d, 665e, 665f, 665g, 665h, and 665i may be configured to easily charge a relatively small electronic device, such as a smart watch, a smart ring, and the like; and the other wireless power transmission/reception conductive pattern elements 666a and 666b may be configured to easily charge a relatively large electronic device, such as a portable terminal, a PDA, and the like. The electronic device 101 including the multiple the wireless power transmission/reception conductive pattern elements may control power, which is supplied to an external electronic device, through each pattern element, and may provide a guide to an appropriate position on the basis of information of the external electronic device. For example, the electronic device 101 may provide (or output) a movement guide to an appropriate position on the basis of the information received from the external electronic device, and may utilize a remaining area to perform a display.

Referring to FIG. 6D, the electronic device 101 according to an embodiment of the present disclosure may include multiple wireless power transmission/reception conductive pattern elements 667a to 667o all having an identical size. The multiple wireless power transmission/reception conductive pattern elements 667a to 667o configured in the electronic device 101 may all have an identical form (e.g., size, shape, etc.) in order to support multiple external wireless power transmission/reception electronic devices having similar forms (e.g., sizes, shapes, thicknesses, etc.). Forms (e.g., sizes, shapes, etc.) of the wireless power transmission/reception conductive pattern elements may have positions determined based on a point which minimizes mutual interference between the wireless power transmission/reception conductive pattern elements. The multiple wireless power transmission/reception conductive pattern elements 667a to 667o, which are indicated by dotted lines, may be configured in one layer in the display apparatus described below with reference to FIG. 8.

Figure 6E:
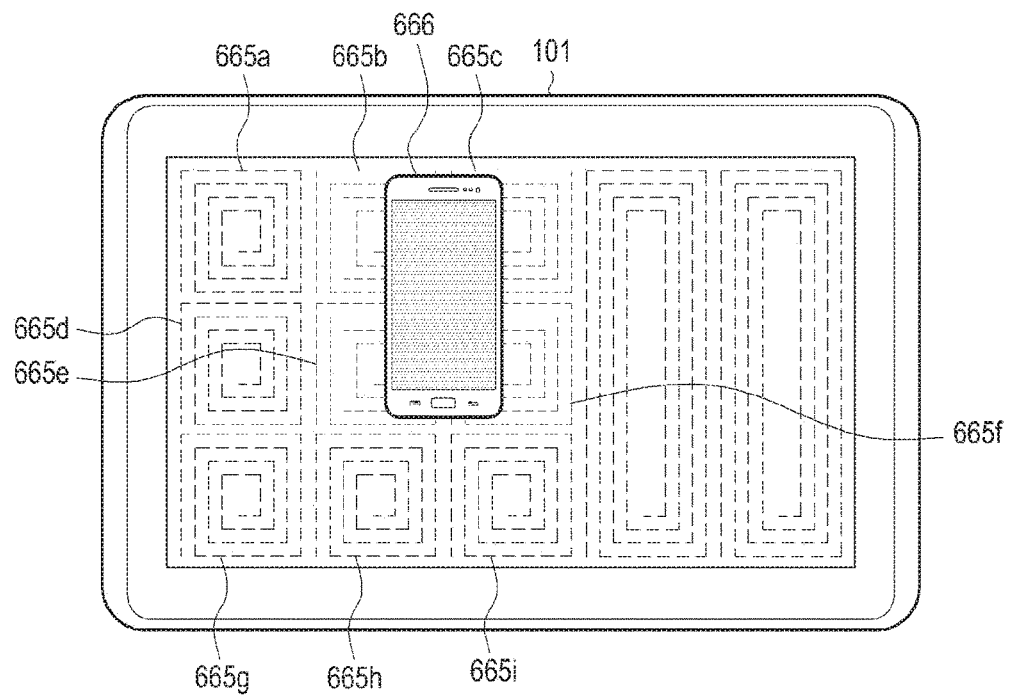
FIG. 6E illustrates a method of an electronic device for performing wireless charging on a basis of information of an external wireless power transmission/reception electronic device, according to an embodiment of the present disclosure.

FIG. 6E illustrates a method of an electronic device for performing wireless charging on a basis of information of an external wireless power transmission/reception electronic device, according to an embodiment of the present disclosure.

Referring to FIG. 6E, the electronic device 101 may select some pattern elements, such as pattern elements 665b, 665c, 665e, and 665f, from among multiple wireless power transmission/reception conductive pattern elements 665a, 665b, 665c, 665d, 665e, 665f, 665g, 665h, 665i, 666a, and 666b, shown in FIG. 6C, as pattern elements that wirelessly supply power to an external electronic device 666. The number of the selected pattern elements may increase in response to the size of the external electronic device 666 intended to be charged. When the position of the external electronic device 666 is moved in a state where the external electronic device 666 is being charged, the electronic device 101 may continuously provide charging by using pattern elements corresponding to the changed position, and the external electronic device 666 may be continuously charged. Also, a remaining area other than an area corresponding to the selected pattern elements may be utilized to perform a display. For example, the electronic device 101 may provide (or output) a movement guide to an appropriate position on the basis of information received from the external electronic device, and may utilize a remaining area to perform a display.

Figure 6F:
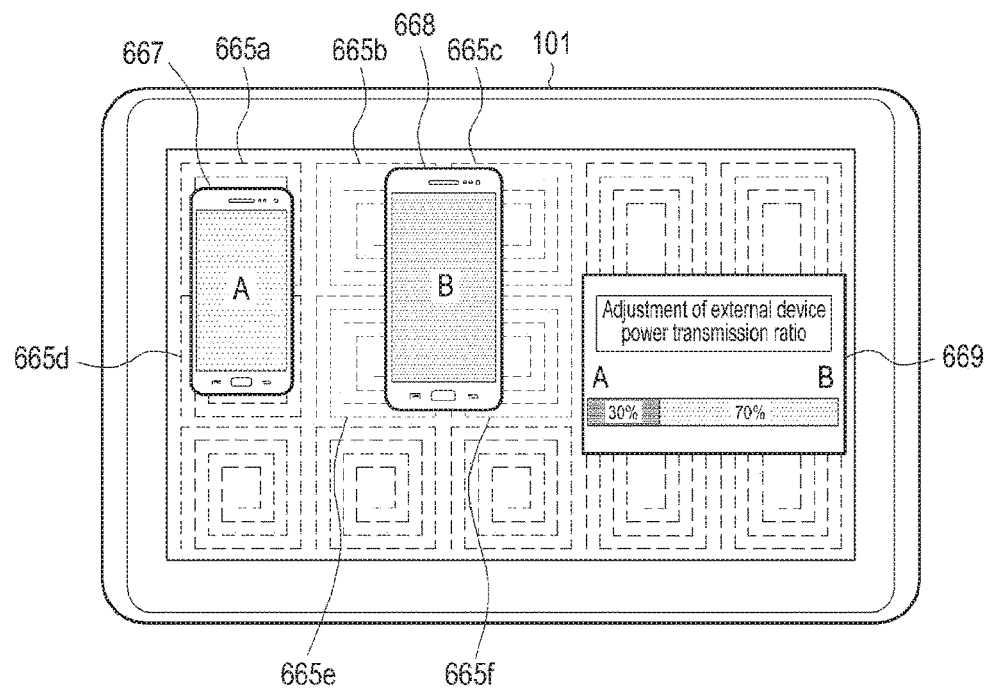
FIG. 6F illustrates a screen of an electronic device displaying a result of placing multiple electronic devices on an electronic device, according to an embodiment of the present disclosure.

FIG. 6F illustrates a screen of an electronic device displaying a result of placing multiple electronic devices on an electronic device, according to an embodiment of the present disclosure.

Referring to FIG. 6F, the electronic device 101 may select some pattern elements, such as pattern elements 665a and 665d, from among multiple wireless power transmission/reception conductive pattern elements 665a, 665b, 665c, 665d, 665e, 665f, 665g, 665h, 665i, 666a, and 666b, as pattern elements that wirelessly supply power to a first external electronic device 667, and may select some other pattern elements, such as pattern elements 665b, 665c, 665e, and 665f, from among the multiple wireless power transmission/reception conductive pattern elements 665a, 665b, 665c, 665d, 665e, 665f, 665g, 665h, 665i, 666a, and 666b, as pattern elements that wirelessly supply power to a second external electronic device 668. The number of the pattern elements selected according to the respective first and second external electronic devices 667 and 668 may increase or decrease in response to sizes of external electronic devices intended to be charged. When the position of at least one of the first and second external electronic devices 667 and 668 is moved in a state where at least one of the first and second external electronic devices 667 and 668 is being charged, the electronic device 101 may continuously provide charging to the moved first and second external electronic devices 667 and 668 by using pattern elements corresponding to the changed position, and the first and second external electronic devices 667 and 668 may be continuously charged. Also, a remaining area other than an area corresponding to the selected pattern elements may be utilized to perform a display. For example, the electronic device 101 may provide (or output) a movement guide to an appropriate position on the basis of information received from the at least one of the first and second external electronic devices 667 and 668, and may utilize a remaining area to perform a display. Also, when the amount of power required by the first and second external electronic devices 667 and 668 is larger than the amount of power supplied by the electronic device 101, the electronic device 101 may display a setting screen 669 capable of setting a transmission ratio, a priority, and the like. For example, when the user adjusts a transmission ratio or a priority on the setting screen 669, the electronic device 101 may adjust and provide an amount of power to each of the first and second external electronic devices 667 and 668 so as to correspond with a result of the adjustment.

Figure 7:
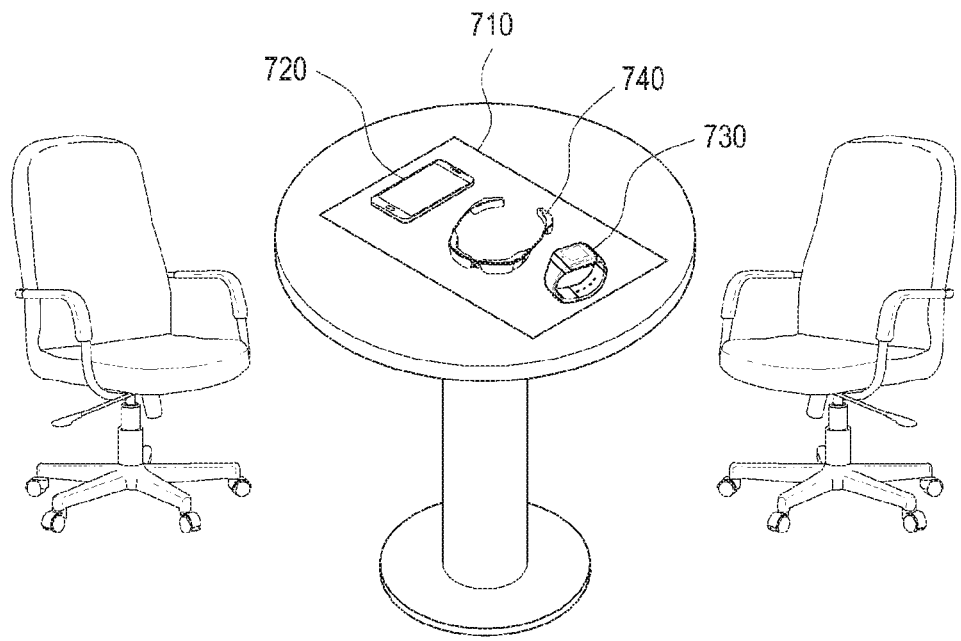
FIG. 7 illustrates an electronic device mounted on a table, according to an embodiment of the present disclosure.

FIG. 7 illustrates an electronic device mounted on a table, according to an embodiment of the present disclosure Referring to FIG. 7, the electronic device 101, including a display apparatus 710, is shown mounted on a table. The electronic device 101 may wirelessly receive power from an external wireless power transmission electronic device and may be charged with the received power, or may wirelessly transmit power to at least one of other external electronic devices. The electronic device 101 is capable of wirelessly transmitting or receiving power as described above, and the display apparatus 710 of the electronic device 101 may include at least one wireless power transmission/reception conductive pattern element (e.g., a wireless charging coil). Also, the display apparatus 710 may be placed to coincide with the plane of the table. The electronic device 101 including the display apparatus 710 may be mounted on various other objects, such as furniture, a desk, and the like. The display apparatus 710 may display at least one piece of placement information on a wireless power transmission/reception conductive pattern element selected in response to sensing at least one external electronic device, such as first, second, and third external electronic devices 720, 730, and 740, placed on the electronic device 710. As another example, the display apparatus 710 may display a screen in a remaining area other than an area corresponding to the sensed external electronic device.

When the at least one of the first, second, and third external electronic devices 720, 730, and 740 is sensed, the electronic device 710 may select a wireless power transmission/reception conductive pattern element corresponding to the sensed first, second, and/or third external electronic devices 720, 730, and 740, among the multiple wireless power transmission/reception conductive pattern elements, and may charge the first, second, and/or third external electronic devices 720, 730, and 740 by using the selected wireless power transmission/reception conductive pattern element.

As another example, when the first, second, and third external electronic devices 720, 730, and 740 are sensed, the electronic device 710 may select wireless power transmission/reception conductive pattern elements respectively corresponding to the sensed first, second, and third external electronic devices 720, 730, and 740, among the multiple wireless power transmission/reception conductive pattern elements, and may charge the respective first, second, and third external electronic devices 720, 730, and 740 by using the selected wireless power transmission/reception conductive pattern elements.

According to an embodiment of the present disclosure, when the electronic device 710 is mounted on a piece of furniture, a user interface may not be implemented by a display, but may be implemented by a light-emitting element (e.g., an LED).

Figure 8:
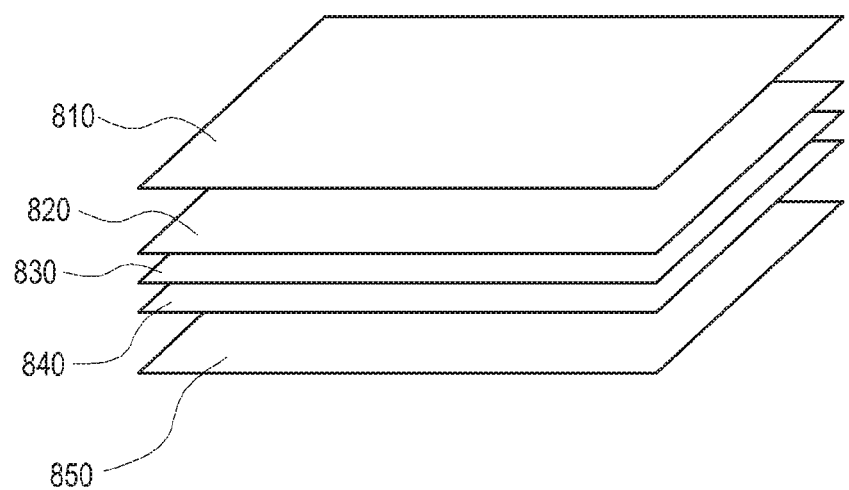
FIG. 8 illustrates layers of a display apparatus including multiple wireless power transmission/reception conductive pattern elements, according to an embodiment of the present disclosure.

FIG. 8 illustrates layers of a display apparatus including multiple wireless power transmission/reception conductive pattern elements, according to an embodiment of the present disclosure.

Referring to FIG. 8, the display apparatus 320 including the multiple wireless power transmission/reception conductive pattern elements may include multiple layers 810, 820, 830, 840, and 850.

The first layer 810 may be a panel in which both surfaces of glass are coated with a thin metal conductive material (e.g., Indium Tin Oxide (ITO) film, etc.) so as to allow a current to flow on both surfaces of the glass and which is coated with a dielectric capable of storing a charge. The first layer 810 may be formed of various materials capable of supporting the second layer 820 to the fifth layer 850. For example, the first layer 810 may be made of a glass substrate or a plastic substrate. When an input unit (e.g., a user's finger or a pen) touches the surface of the first layer 810, static electricity may cause a predetermined amount of charge to move to a touched position, and the first layer 810 may sense the touched position by recognizing a change in the amount of a current according to the movement of the charge. The first layer 810 enables the sensing of all touches capable of generating static electricity and the sensing of a touch by a finger or a pen which is an input unit.

The second layer 820 and the fourth layer 840 are formed of a material capable of shielding an electric field generated by the third layer 830. The second layer 820 and the fourth layer 840 may minimize an electric field, which is generated during charging, by shielding the electric field generated by the third layer 830. The minimization of an electric field may reduce an interference effect caused by static electricity which is generated by a touch or hovering on the first layer 810. The second layer 820 and the fourth layer 840 may be formed to cover the third layer 830.

The third layer 830 may include at least one conductive pattern element, and a shielding layer (or shielding material) may be included between the conductive pattern elements of the third layer 830. A structure including the shielding layer (or shielding material) may prevent the flow of power of a conductive pattern element, which is being used to wirelessly transmit/receive power, into an unused conductive pattern element. The shielding layer (or shielding material) between the conductive pattern elements may be included even in a display apparatus that does not include the second layer 820 and the fourth layer 840. According to the performance of the electronic device 101 or that of the display apparatus 320, at least one of the second layer 820 and the fourth layer 840 may be excluded from the display apparatus 320, or a location at which at least one of the second layer 820 and the fourth layer 840 is configured may be changed. Each of wireless power transmission/reception conductive pattern elements included in the third layer 830 may be configured by winding a wire, or may be configured in such a manner as to be printed in a predetermined pattern. As another example, at least one wireless power transmission/reception conductive pattern element configured in the third layer 830 may be configured in such a manner as to be printed on a transparent conductive material. As still another example, wireless power transmission/reception conductive pattern elements may all have an identical inductance value in order to satisfy a frequency used to wirelessly transmit/receive power, or may have different inductance values so as to wirelessly transmit/receive power to/from different devices. For example, when the wireless power transmission/reception conductive pattern elements all have an identical inductance value, a resonance condition may be satisfied. Under the control of the control circuit 310, the wireless power transmission/reception conductive pattern elements may operate in a wireless power transmission mode for transmitting wireless power to an external wireless power reception electronic device, or may operate in a wireless power reception mode for receiving wireless power from an external wireless power transmission electronic device.

The fifth layer 850 may be a panel, such as an LCD panel, an active matrix organic light emitting diode (AMOLED) panel, and the like, and may display various operation statuses of the electronic device 101, various images according to the execution of an application, a service, and the like, and multiple objects. For example, the electronic device 101 may display a screen, which has a predetermined form, in the fifth layer 850 in response to a hovering or touch by a forger, a pen, or an input unit. The fifth layer 850 may display an object, such as a photograph, handwriting, and a document. The fifth layer 850 may display information corresponding to the sensing of an external wireless power transmission/reception electronic device. The fifth layer 850 may display placement information on a wireless power transmission/reception conductive pattern element corresponding to the sensed external wireless power transmission/reception electronic device among the multiple wireless power transmission/reception conductive pattern elements. When the external wireless power transmission/reception electronic device is placed to correspond to the placement information, the fifth layer 850 may display a screen, which is displayed by the display apparatus 320, in a remaining area other than an area in which the external wireless power transmission/reception electronic device has been sensed, on the basis of at least part of information which is being displayed by the display apparatus 320. The fifth layer 850 may display information, which indicates that the external wireless power transmission/reception electronic device 101 is wirelessly transmitting or receiving power, in at least partial area of the display apparatus 320. When the external wireless power transmission/reception electronic device is not placed to correspond to the placement information, the fifth layer 850 may display guide information so that the external wireless power transmission/reception electronic device may be placed to correspond to the placement information, through a visual notification (e.g., arrow indication, position blinking, or the like). The fifth layer 850 may determine that an external wireless power transmission/reception electronic device is approaching, through a hovering. For example, when the fifth layer 850 determines that the external wireless power transmission/reception electronic device is approaching before the placement of the external wireless power transmission/reception electronic device on the display apparatus 320, the electronic device 101 may display placement information through the display device 320.

The layers 810, 820, 830, 840, and 850 configured in the display apparatus 320 may have locations changed according to the performance of the electronic device 101 or that of the display apparatus 320. The layers 810, 820, 830, 840, and 850 may be formed at various locations in order to improve the efficiency of transmission/reception of wireless power with an external wireless power transmission/reception electronic device. For example, at least one of the second layer 820 and the fourth layer 840 may be excluded from the display apparatus 320. At least some of the conductive pattern elements may be transparent. While a case has been described in which a touch or proximity due to a touch or hovering is sensed and the display of information corresponding to the sensing is performed in the fifth layer 850, this configuration is for illustrative purposes only, and a sensing panel that senses a touch or proximity due to a touch or hovering and a display panel that displays information corresponding to the sensing may be included. In this case, the sensing panel may be disposed above the display panel. Also, in the display apparatus 320, one of layers of the display panel may be configured as a layer including multiple wireless power transmission/reception conductive pattern elements. Further, when the display apparatus 320 is implemented by an OLED display, layers including conductive pattern elements at a lower end part of the display panel may be laminated.

The term "module" as used herein may refer to a unit including hardware, software, firmware or a combination thereof. The term "module" may be interchangeable with a term, such as a unit, a logic, a logical block, a component, or a circuit. The "module" may be a minimum unit of an integrated component or a part thereof. The "module" may be a minimum unit for performing one or more functions or a part thereof. The "module" may be mechanically or electronically implemented. For example, the "module" may include at least one of an application-specific integrated circuit (ASIC) chip, a field-programmable gate arrays (FPGA), and a programmable-logic device for performing operations which has been known or are to be developed hereinafter.

According to various embodiments of the present disclosure, at least part of the device (e.g., modules or functions thereof) or the method (e.g., operations) may be implemented by an instruction stored in a computer-readable storage medium provided in a form of a programming module. When the instruction is executed by a control circuit, the control circuit may perform a function corresponding to the instruction. The computer-readable storage medium may be the memory 360. At least part of the programming module may be implemented by the control circuit. At least part of the programming module may include a module, a program, a routine, a set of instructions, or a process for performing one or more functions.

The computer readable recording medium includes magnetic media such as a hard disk, a floppy disk and a magnetic tape, optical media, such as a compact disc read only memory (CD-ROM) and a digital versatile disc (DVD), magneto-optical media, such as a floptical disk, and a hardware device specially configured to store and execute a program command, such as a read only memory (ROM), a random access memory (RAM) and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module may include one or more of the aforementioned elements or may further include other additional elements, or some of the aforementioned elements may be omitted. Operations executed by a module, a programming module, or other elements may be executed sequentially, in parallel, repeatedly, or in a heuristic manner. Furthermore, some operations may be executed in a different order or may be omitted, or other operations may be added.

The embodiments of the present disclosure shown and described in this specification and the drawings correspond to specific examples presented in order to easily describe technical contents of the present disclosure and to help an understanding of the present disclosure, and are not intended to limit the scope of the present disclosure. Therefore, it should be construed that, in addition to the embodiments disclosed herein, all modifications and changes or modified and changed forms derived from the technical idea of the present disclosure fall within the scope of the present disclosure. Accordingly, the scope of the present disclosure is defined, not by the detailed description and embodiments, but by the following claims and their equivalents.

What is claimed is:

1. A method for controlling wireless power charging by an electronic device, the method comprising:
   detecting at least one electronic device;
   identifying at least one wireless coil pattern corresponding to the at least one electronic device from among a plurality of wireless coil patterns included in a display of the electronic device; and
   controlling wireless power charging of the at least one electronic device based on the at least one wireless coil pattern.

2. The method as claimed in claim 1, wherein controlling the wireless power charging display comprises displaying placement information corresponding to the at least one wireless coil pattern on the display.

3. The method as claimed in claim 2, wherein controlling the wireless power charging further comprises identifying whether the at least one electronic device is placed on a first area corresponding to the placement information.

4. The method as claimed in claim 2, wherein the placement information comprises coordinate information at which the at least one electronic device is to be placed.

5. The method as claimed in claim 3, further comprising, when the at least one electronic device is identified as being placed on the first area, displaying, on a second area of the display, an item corresponding to at least one function provided by the electronic device, the second area being different from the first area.

6. The method as claimed in claim 3, further comprising, when the at least one electronic device is identified as being placed on the first area, displaying information indicating that the at least one electronic device is being charged.

7. The method as claimed in claim 3, further comprising, when the at least one electronic device is identified as not being placed on the first area, displaying guide information for the first area.

8. The method as claimed in claim 1, wherein detecting the at least one electronic device comprises:
    detecting the at least one electronic device based on receiving a signal from the at least one electronic device; and
    identifying placement of the at least one electronic device on the display.

9. The method as claimed in claim 1, further comprising determining information of the at least one electronic device.

10. The method as claimed in claim 1, wherein controlling the wireless power charging comprises:
    activating the at least one wireless coil pattern; and
    deactivating, from among the plurality of wireless coil patterns, remaining wireless coil patterns, which are different from the at least one wireless coil pattern.

11. The method as claimed in claim 1, wherein controlling the wireless power charging comprises wirelessly transmitting power to the at least one electronic device from the electronic device, or wirelessly receiving power from the at least one electronic device.

12. The method as claimed in claim 1, wherein, when the at least one electronic device includes at least two devices, the at least one wireless coil pattern includes a first pattern corresponding to a first device of the at least two devices and a second pattern corresponding to a second device of the at least two devices.

13. An electronic device for controlling wireless power charging, the electronic device comprising:
    at least one sensor;
    a display;
    at least one processor; and
    a memory configured to store instructions which, when executed by the at least one processor, cause the at least one processor to perform operations including:
    detecting at least one electronic device,
    identifying at least one wireless coil pattern corresponding to the at least one electronic device from among a plurality of wireless coil patterns included in the display, and
    controlling wireless power charging of the at least one electronic device based on the at least one wireless coil pattern.

14. The electronic device of claim 13, wherein the at least one processor is further configured to display placement information corresponding to the at least one wireless coil pattern on the display.

15. The electronic device of claim 14, wherein the at least one processor is further configured to identify whether the at least one electronic device is placed on a first area corresponding to the placement information.

16. The electronic device of claim 15, wherein the as least one processor is further configured to:
    activate coil pattern, and
    deactivate, from among the plurality of wireless coil patterns, remaining wireless coil patterns, which are different from the at least one wireless coil pattern.

17. The electronic device of claim 15, wherein, when the at least one electronic device is identified as being placed on the first area, the at least one processor is further configured to display an item corresponding to at least one function provided by the electronic device on a second area of the display, the second area being different from the first area, and
    wherein, when the at least one electronic device is identified as not being placed on the first area, the at least one processor is further configured to display guide information for the first area.

18. The electronic device of claim 13, wherein the at least one processor is further configured to wirelessly transmit power to the at least one electronic device, or wirelessly receive power from the at least one electronic device.

19. The electronic device of claim 13, wherein, when the at least one electronic device includes at least two devices, the at least one wireless coil pattern includes a first pattern corresponding to a first device of the at least two devices and a second pattern corresponding to a second device of the at least two devices.

20. A non-transitory computer-readable storage medium storing instructions which, when executed by the at least one processor of an electronic device, cause the at least one processor to perform a method for controlling wireless power charging, the method comprising:
    detecting at least one electronic device;
    identifying at least one wireless coil pattern corresponding to the at least one electronic device from among a plurality of wireless coil patterns included in a display of the electronic device; and
    controlling wireless power charging of the at least one electronic device based on the at least one wireless coil pattern.

* * * * *